(12) United States Patent
Vikberg et al.

(10) Patent No.: US 7,283,518 B2
(45) Date of Patent: *Oct. 16, 2007

(54) COMBINING NARROWBAND APPLICATIONS WITH BROADBAND TRANSPORT

(75) Inventors: Jari Tapio Vikberg, Järna (SE); Tomas Nylander, Stavsnäs (SE)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 692 days.

This patent is subject to a terminal disclaimer.

(21) Appl. No.: 10/719,337

(22) Filed: Nov. 22, 2003

(65) Prior Publication Data

US 2004/0114570 A1    Jun. 17, 2004

Related U.S. Application Data

(63) Continuation of application No. 10/261,973, filed on Sep. 30, 2002, now Pat. No. 6,744,768, which is a continuation-in-part of application No. 09/866,135, filed on May 25, 2001, now Pat. No. 7,054,305, which is a continuation of application No. 09/353,135, filed on Jul. 14, 1999, now Pat. No. 6,775,266.

(51) Int. Cl.
    *H04L 12/66*     (2006.01)
(52) U.S. Cl. .................................... 370/352
(58) Field of Classification Search ............... None
    See application file for complete search history.

(56) References Cited

U.S. PATENT DOCUMENTS

| | | | |
|---|---|---|---|
| 6,314,103 B1 * | 11/2001 | Medhat et al. ........... 370/395.2 |
| 6,496,508 B1 * | 12/2002 | Breuckheimer et al. .... 370/397 |
| 6,714,544 B1 * | 3/2004 | Bosloy et al. ........... 370/395.1 |
| 6,744,768 B2 * | 6/2004 | Vikberg et al. ......... 370/395.21 |
| 6,775,266 B1 * | 8/2004 | Furtenback et al. ........ 370/352 |
| 6,917,586 B1 * | 7/2005 | Mauger et al. ............. 370/230 |
| 6,999,474 B1 * | 2/2006 | Goyal et al. ................ 370/468 |

(Continued)

OTHER PUBLICATIONS

Ash G et al: "Traffic Engineering & Qos Methods for IP, ATM and TDM Based Multiservice Networks" Internet Draft, 'Online! Jul. 2000, XP002266757 Retrieved from the Internet: URL:http://www.potaroo.net/ietf/old-ids/draft-ash-te-gos-routing-01.txt' retrieved on Jan. 8, 2004! Annex 2, paragraph 6.

(Continued)

*Primary Examiner*—Chi Pham
*Assistant Examiner*—Anh-Vu Ly
(74) *Attorney, Agent, or Firm*—Michael Cameron

(57) ABSTRACT

The combination of narrowband applications with broadband transport may be enabled with a communications architecture, in which one or more Media Gateways (MGs) that include broadband switching fabric are controlled by a Media Gateway Controller (MGC) that includes switching intelligence and narrowband switching fabric. A new data structure is provided in the MGC to identify bandwidth allocation on all traffic trunks interconnecting MGs controlled by the MGC. The new data structure can further maintain quality data representing the quality of packet transmissions in the broadband network data. The new data structure enables the MGC to monitor congestion in the broadband network and to allocate bandwidth more efficiently.

22 Claims, 26 Drawing Sheets

U.S. PATENT DOCUMENTS

| | | | |
|---|---|---|---|
| 7,009,982 B2* | 3/2006 | Scott et al. | 370/401 |
| 7,054,305 B2* | 5/2006 | Furtenback et al. | 370/352 |
| 7,136,378 B2* | 11/2006 | Bi et al. | 370/356 |
| 2002/0176404 A1* | 11/2002 | Girard | 370/352 |
| 2003/0099192 A1* | 5/2003 | Scott et al. | 370/229 |
| 2003/0193957 A1* | 10/2003 | Cable et al. | 370/395.51 |

OTHER PUBLICATIONS

Collatz C et al: "Integrated Management Solution for Next Generation Networks" Electrical Communication, Alcatel. Brussels, BE, No. 2, Apr. 1, 2001, pp. 148-153, XP001065327 ISSN: 0013-4252 figure 3 p. 150, right-hand column, line 14-p. 151, left-hand column, line 6.

Lee W C et al: "Routing Subject to Quality of Service Contraints in Integrated Communication Networks" IEEE Network, IEEE Inc. NewYork, US, pp. 46-55, XP000526591 ISSN: 0890-8044 p. 48, right-hand column, line 61-p. 49, left hand column, line 60 p. 51, left-hand column, line 60-right-hand column, line 59.

* cited by examiner

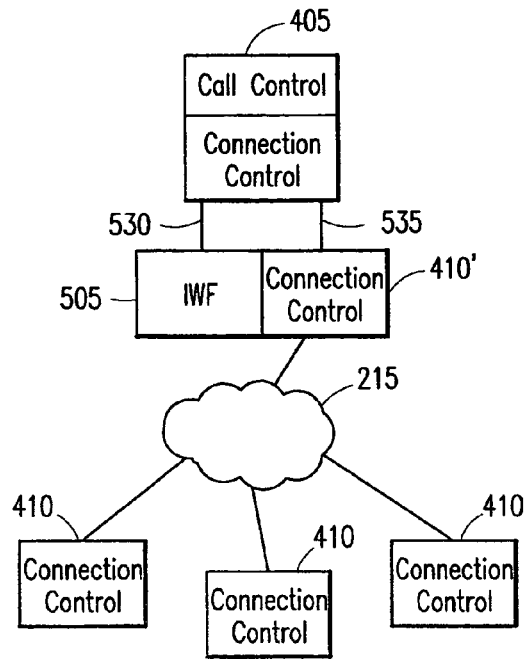
*FIG. 5A*
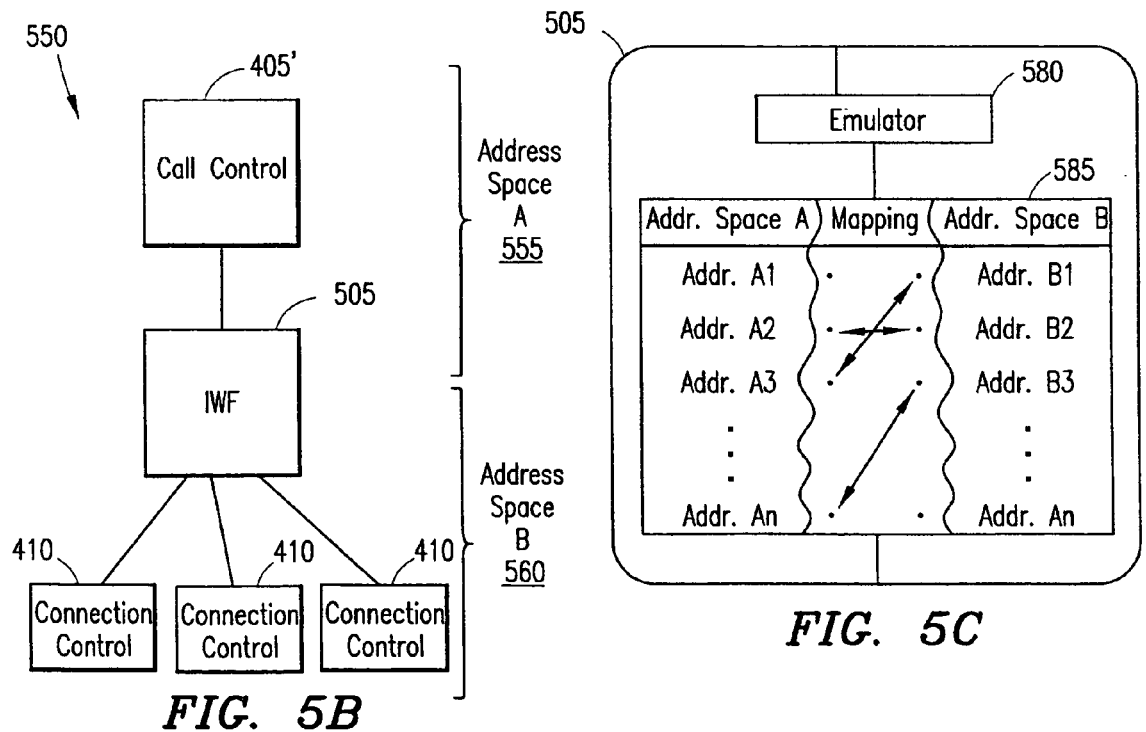
*FIG. 5B*
*FIG. 5C*

ML—Media Logic
MGW—Media Gateway
LE—Local Exchange
AN—Generic Access Node
PBX—Private Branch Exchange
TDM—2M PCM link
NNI—Node Network Interface
UNI—User Network Interface

| Field 1305 | 1310 | 1325 1320 | 1335 1330 | 1345 Bandwidth Data Structure 1300 1340 | 1355 1350 |
|---|---|---|---|---|---|
| 1315 | Outgoing MG | Incoming MG | Bandwidth avail. | Total bandwidth | Statistics |
| Records 1360 | MG3 | MG1 | 0 Mb | 50 Mb | .... |
| | MG2 | MG1 | 5 Mb | 30 Mb | .... |
| | ⋮ | ⋮ | ⋮ | ⋮ | ⋮ |

COMBINING NARROWBAND APPLICATIONS WITH BROADBAND TRANSPORT

CROSS-REFERENCES TO RELATED APPLICATIONS

This Nonprovisional Application for Patent is a Continuation of U.S. Nonprovisional application for patent Ser. No. 10/261,973, filed on Sep. 30, 2002 now U.S. Pat. No. 6,744,768, which is Continuation-In-Part of U.S. Nonprovisional application for patent Ser. No. 09/866,135, filed on May 25, 2001 now U.S. Pat. No. 7,054,305, which is a Continuation of U.S. Nonprovisional application for patent Ser. No. 09/353,135, filed on Jul. 14, 1999 now U.S. Pat. No. 6,775,266. U.S. Nonprovisional application for patent Ser. Nos. 09/353,135 and 09/866,135 are hereby incorporated by reference in their entirety herein.

This Nonprovisional Application for Patent is related by subject matter to U.S. Nonprovisional applications for patent Ser. Nos. 09/764,622, 09/765,119, 09/764,960, and 09/764,953, all of which were filed on Jan. 17, 2001. U.S. Nonprovisional applications for patent Ser. Nos. 09/764,622, 09/765,119, 09/764,960, and 09/764,953 are also hereby incorporated by reference in their entirety herein.

This U.S. Nonprovisional Application for Patent is also related by subject matter to U.S. Nonprovisional applications for patent Ser. Nos. 10/025,354, filed on Dec. 18, 2001, 10/027,361, filed on Dec. 21, 2001, 10/021,940, filed on Dec. 12, 2001, and 10/028,176, filed on Dec. 21, 2001. These U.S. Nonprovisional applications for patent Ser. Nos. 10/025,354, 10/027,361, 10/021,940, and 10/028,176 are also hereby incorporated by reference in their entirety herein.

BACKGROUND OF THE INVENTION

1. Technical Field of the Invention

The present invention relates in general to the field of communications, and in particular, by way of example but not limitation, to using broadband transport for narrowband telephony and data communications.

2. Description of Related Art

The increasing interest for high band services such as multimedia applications, video on demand, video telephone, and teleconferencing has motivated development of the Broadband Integrated Service Digital Network (B-ISDN). B-ISDN is based on a technology known as Asynchronous Transfer Mode (ATM) and offers considerable extension of telecommunications capabilities.

ATM is a packet-oriented transfer mode which uses asynchronous time division multiplexing techniques. The packets are called cells and traditionally have a fixed size. A standard ATM cell comprises 53 octets, five of which form a header and 48 of which constitute a "payload" or information portion of the cell. The header of the ATM cell includes two quantities that are used to identify a connection in an ATM network over which the cell is to travel. These two quantities include the Virtual Path Identifier (VPI) and the Virtual Channel Identifier (VCI). In general, a virtual path is a principal path defined between two switching nodes of the network; a virtual channel is one specific connection on the respective principal path.

At its termination points, an ATM network is connected to terminal equipment, e.g., ATM network users. In between ATM network termination points, there are typically multiple switching nodes. The switching nodes have ports which are connected together by physical transmission paths or links. Thus, in traveling from an originating terminal equipment to a destination terminal equipment, ATM cells forming a message may travel through several switching nodes and the ports thereof.

Of the multiple ports of a given switching node, each may be connected via a link circuit and a link to another node. The link circuit performs packaging of the cells according to the particular protocol in use on the link. A cell that is incoming to a switching node may enter the switching node at a first port and exit from a second port via a link circuit onto a link connected to another node. Each link can carry cells for multiple connections, with each connection being, e.g., a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a message to travel from an ingress side/port of the switch to an egress side/port of the switch. The message can therefore ultimately travel from the originating terminal equipment to the destination terminal equipment.

While ATM, because of the high speed and bandwidth that it offers, is envisioned as the transport mechanism for more advanced services such as B-ISDN, it nevertheless must be recognized that the current narrowband networks (e.g., Public Switched Telephone Networks (PSTN), ISDN, etc.) will remain in use (at least in part) for quite some time. It has taken decades for the present voice switched telephony networks (e.g., PSTN, ISDN, etc.) to reach their present advanced functionalities. While ATM networks are being built, the ATM networks will likely not easily acquire all the functionalities of advanced voice communication. Therefore, at least initially, ATM networks/nodes will in some instances be added to parts or will replace parts of circuit switched telephony networks. In such instances, ATM will be used for transport and switching. ATM can actually be used as a single transport and switching mechanism for multiple other networks, including multiple other different types of networks. For example, a single ATM network can be used to transport and switch communications from mobile networks (e.g., Public Land Mobile Networks (PLMNs)), Internet protocol (IP)-based networks (e.g., the Internet), etc., as well as landline networks such as PSTNs and ISDNs.

U.S. Pat. Nos. 5,568,475 and 5,483,527 to Doshi et al., for example, incorporate ATM switches for routing telephony voice signals between Synchronous Transfer Mode (STM) nodes. The ATM switches use a signaling system No. 7 (SS#7) network to establish a virtual connection, rather than a circuit switched connection, as would be the case in a pure STM network. The signaling system No. 7 (SS#7) network of U.S. Pat. Nos. 5,568,475 and 5,483,527 includes signal transfer points (STPs) that are connected by special physical links to each of the ATM switch nodes. For call setup, for example, signaling messages are relayed through the signaling system No. 7 (SS#7) network. In such relaying, a non-ATM STP receives the signaling message and advises its associated ATM node of the call setup. The associated ATM node may then identify idle resources to be used for forwarding voice signals to the next ATM node once the call has been setup, and it may prepare its own signaling message to be used in the relay.

The signaling message for the relay that is prepared by the ATM node is returned to its associated STP, which forwards the signaling message via the signaling system No. 7 (SS#7) network to another STP associated with the next ATM node. Such relaying continues until the signaling message reaches an STP of an STM local exchange carrier (LEC). Once the call has been set up, the ensuing speech (or voice-band data) is transported via the ATM nodes. STM/ATM terminal adapters are situated between the STM network and the ATM network for packing samples of voice signals as received from the STM network into ATM cells for application to the ATM network, and for unpacking ATM cell payloads to obtain voice signals for application to the STM network from the ATM network. The incorporation of ATM into an STM network in the particular manner as described above thus involves a non-ATM signaling network alongside the ATM nodes. Furthermore, each STP node associated with an ATM node performs only call control functions in the network of Doshi et al. Otherwise and in general, call control and connection control is traditionally combined in conventional communication nodes.

With reference now to FIG. 1A, a conventional unified communications node is illustrated at 100. The conventional unified communications node 100 may represent any general purpose switching node in a telecommunications network such as a PSTN. Within the conventional communications node 100, the call control 105 functions and the connection control 110 functions are united. The call control 105 and the connection control 110 functions together encompass the entire seven (7) layers of the Open System Interconnection (OSI) protocol. These seven (7) layers are denoted as the physical, data link, network, transport, session, presentation, and application layers. Accordingly, the conventional communications node 100 may perform all functions related to both switching intelligence and switching fabric. Conventional communication nodes 100 are not, however, capable of handling the interworking between (i) narrowband telephony and data communications and (ii) broadband communications using faster and higher bandwidth networks, such as ATM networks.

With reference now to FIG. 1B, a conventional approach to separating functions of the conventional unified communications node of FIG. 1A is illustrated generally at 150. Conventional approaches attempt to meet the stringent demands of interworking narrowband telephony and data communications with broadband networks using ATM by separating control functions. Specifically, call control 155 functions are separated from connection control 160 functions. The call control 155 functions are thereby made independent of any particular set of connection control 160 functions. This separation is typically accomplished by utilizing a conventional communications node (such as the conventional communications node 100 of FIG. 1A) that is stripped of its switching intelligence, leaving only the connection control 160. In effect, a conventional communications node 100 is modified by removing or rendering inoperative the call control 105 functions, thus leaving only the connection control 110 functions. This modified conventional communications node is substituted as the connection control 160 part. The call control 155 part, on the other hand, is typically designed and created without relying on traditional telecommunications hardware or software.

With reference now to FIG. 2, an existing scheme for utilizing a broadband network in conjunction with nodes corresponding to separated functions of a conventional unified communications node is illustrated generally at 200. Switching intelligence 205A,205B parts are connected to switching fabric 210A,210B parts. The switching fabric 210A,210B parts are connected to the ATM network 215, and they effect required emulation and cell packing for interworking a narrowband network (not shown) with the ATM network 215. The switching intelligence 205A,205B parts are usually realized with a UNIX-based server. The switching intelligence 205A,205B parts are intended to provide the advanced calling services and features (e.g., those traditionally provided by the Intelligence Network (IN)). The switching intelligence 205A,205B parts do not include any switching fabric resources, so they must rely on the switching fabric 210A,210B parts for these resources.

Because the switching intelligence 205A,205B parts do not have any of their own switching fabric resources, they are not directly connected to any transport mechanisms, nor do they include the requisite interface(s) for doing so. Incoming calls are therefore received at a switching fabric 210 part and managed by the associated switching intelligence 205 part. When an incoming call is received at a switching fabric 210 part, call signaling information is sent to the switching intelligence 205 part. The switching intelligence 205 part performs the appropriate call control functions and sends instructions (e.g., in the form of call signaling information) to the switching fabric 210 part. The switching fabric 210 part follows the instructions by making the appropriate connections (e.g., to/through the ATM network 215, to/through a narrowband network (not shown), etc.) for forwarding the call data information for the incoming call. As such, no call data information is (or can be) sent to the switching intelligence 205 part, including from the switching fabric 210 part.

Furthermore, while UNIX-based servers, which realize the switching intelligence 205 parts, may be designed to operate at high speeds, they suffer from a number of deficiencies. First, significant research, design, and testing is required to produce appropriate software code to run the UNIX-based servers as switching intelligence 205 parts. Existing circuit-switched voice telephony networks include many advanced features that require many lines of code that have been gradually developed, tested, and implemented over many years. Duplicating the diverse number and types of features while maintaining the required level of reliability and service using newly written code on a UNIX server is not only a daunting task, but it is also virtually impossible to achieve quickly. Second, it is extraordinarily difficult to migrate gradually from traditional network architectures (e.g., those using the conventional unified communications node 100 of FIG. 1A) to next generation networks that rely on broadband transport mechanisms when deploying nodes with only the switching intelligence 205 part. System operators are essentially forced to simultaneously replace whole portions of their networks in large chunks. The consequential large capital expenditures are naturally undesirable to system operators.

SUMMARY OF THE INVENTION

The present invention is directed to a communications architecture including multiple connection control nodes and one or more cell control nodes for controlling the connection control nodes. Each of the call control nodes includes both switching intelligence and narrowband switching fabric, and each of the connection control nodes includes broadband switching fabric.

In certain embodiment(s), a call control node is referred to as a Media Gateway Controller (MGC) and a connection control node is referred to as a Media Gateway (MG). A new data structure is provided in the MGC and/or MGs to identify bandwidth reservations on all paths interconnecting MGs controlled by the MGC. The new data structure enables the MGC and/or MGs to monitor congestion in the broadband network and to allocate bandwidth more efficiently. The new data structure can also be utilized by the MGC to perform load balancing in the broadband network.

In other embodiment(s), the data structure can further maintain quality data related to the quality of packet transmissions in the broadband network. The MGC can utilize the quality data to further improve bandwidth allocation efficiency. In further embodiments, a statistical analysis of the quality measurements can be performed to monitor faults in the broadband network.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the methods, systems, and arrangements of the present invention may be had by reference to the following detailed description when taken in conjunction with the accompanying drawings wherein:

FIG. 5A illustrates a first exemplary tri-level nodal environment alternative in accordance with the present invention;

FIG. 5B illustrates a second exemplary tri-level nodal environment alternative in accordance with the present invention;

FIG. 5C illustrates an exemplary interworking function in accordance with the present invention;

DETAILED DESCRIPTION OF THE DRAWINGS

Figure 1A:
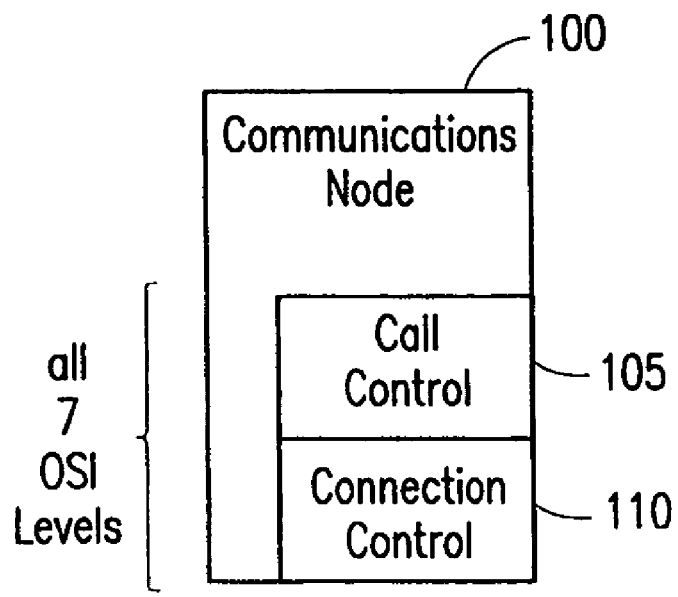
FIG. 1A illustrates a conventional unified communications node.
Figure 1B:
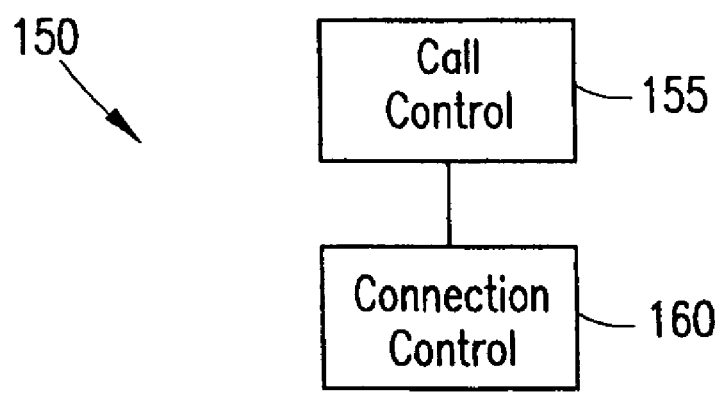
FIG. 1B illustrates a conventional approach to separating functions of the conventional unified communications node of FIG. 1A.
Figure 2:
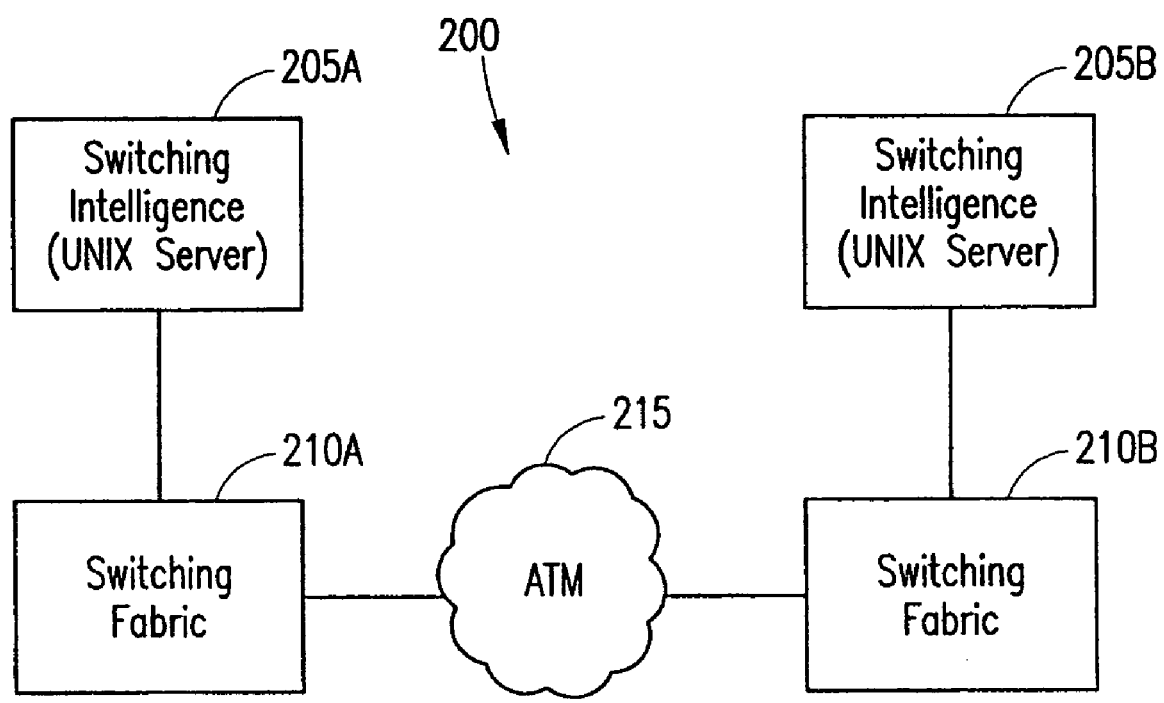
FIG. 2 illustrates an existing scheme for utilizing a broadband network in conjunction with nodes corresponding to separated functions of a conventional unified communications node.

In the following description, for purposes of explanation and not limitation, specific details are set forth, such as particular architectures, interfaces, circuits, information exchanges, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail. It should be understood that the terms "module" and "logic module" as used herein embrace, subsume, and include, inter alia, object oriented programming techniques as well as so-called traditional programming techniques such as, for example, custom-developed applications.

Embodiment(s) of the present invention and advantages thereof are best understood by referring to FIGS. 1A-25 of the drawings, like numerals being used for like and corresponding parts of the various drawings.

In certain embodiments in accordance with the invention (e.g., including embodiment(s) of the invention of the parent applications), ATM is used as a transport and switching mechanism in a hybrid STM/ATM network, while the signaling remains normal narrowband signaling. The narrowband signaling may be transported on permanent paths over ATM connections (e.g., permanent virtual connections (PVCs)), and the narrowband speech channels may be transported on ATM and switched on a "per call basis" (e.g., on-demand) through an ATM switch (e.g., a switched virtual connection (SVC)).

The hybrid STM/ATM network has an access node which services narrowband terminals and which generates a signaling message in connection with call setup. A translator formats the first signaling message into ATM cells so that the first signaling message can be routed through an ATM switch to a circuit switched (e.g., STM) node. The circuit switched node (e.g., PSTN/ISDN) sets up a physical connection for the call and generates a further signaling message for the call, the further signaling message pertaining to the physical connection. The ATM switch routes an ATM-cell-formatted version of the further signaling message to another ATM switch over an ATM physical interface. Thus, the ATM switch switches both narrowband traffic and signaling for the call over the ATM physical interface. The ATM physical interface thus carries an ATM-cell-formatted version of the further signaling message amidst ATM traffic cells.

In view of the fact that the circuit switched node and the ATM switch employ different parameters (e.g., b-channel, etc., for the STM node and VP/VC for the ATM switch), in one embodiment the STM node obtains global position numbers (GPN) for use in setting a path for the further signaling message through the ATM switch. In this regard, at the circuit switched node a translation is made from STM to GPN using an STM/GPN translation table; at the ATM node a translation is made from GPN to VP/VC/port using a GPN/ATM translation table.

The ATM-cell-formatted version of the further signaling message is transported over the ATM physical link and ultimately reaches a destination access node which serves a destination terminal. A destination translator unpacks ATM cells carrying the ATM-cell-formatted version of the further signaling message to obtain the STM signaling information for use by the destination access node. The translators may be situated at the access node, for example. In illustrated embodiment(s), the ATM switches are situated at nodes distinct from the PSTN/ISDN nodes, but such need not be the case in other embodiment(s). The signaling messages can be in accordance with the signaling system no. 7 (SS#7) convention, and the further signaling message can be one of an ISUP or a TUP message, for example.

Figure 3:
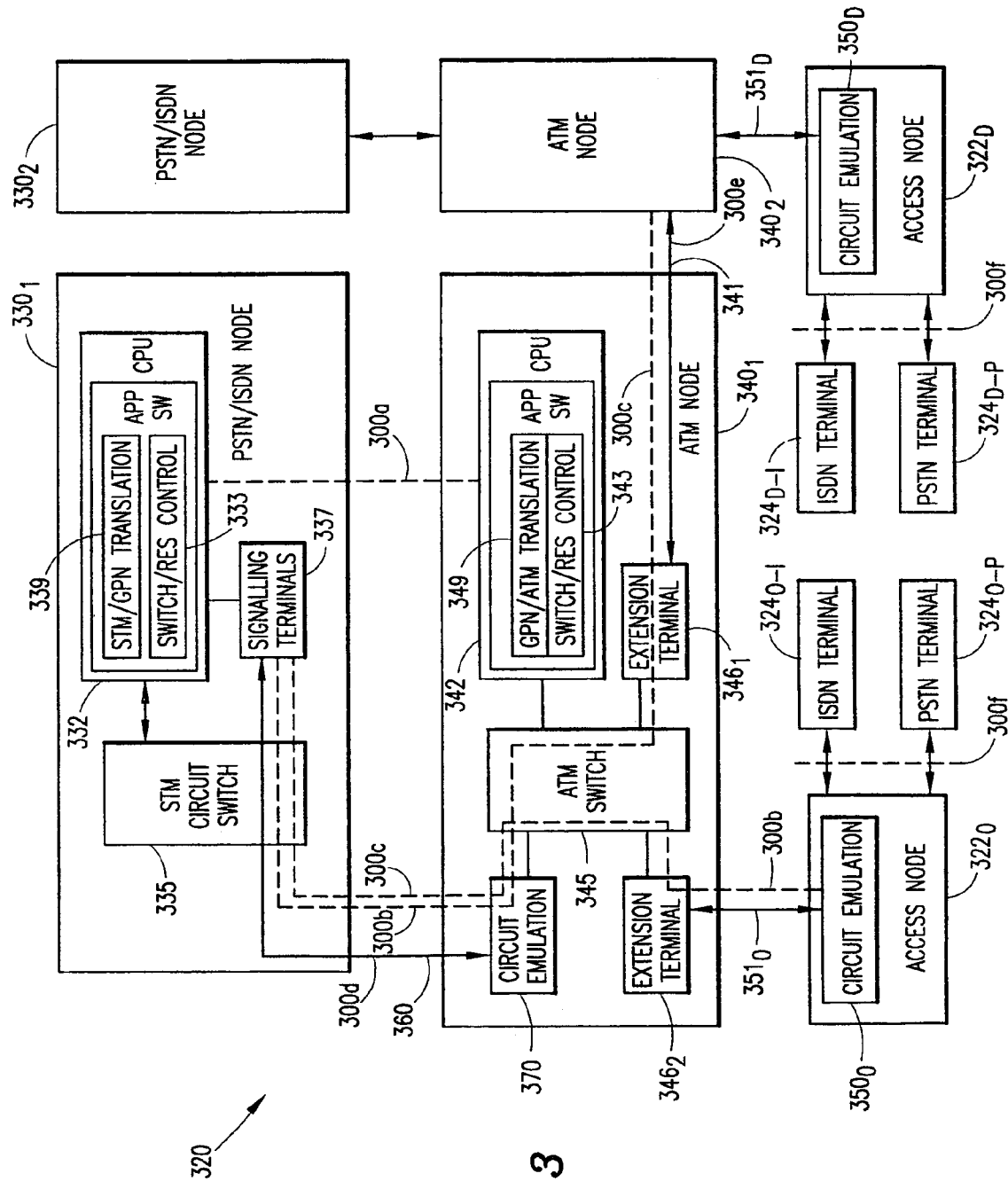
FIG. 3 illustrates an exemplary schematic view of a hybrid STM/ATM network according to an embodiment of the invention.

Referring now to FIG. 3, an exemplary hybrid STM/ATM network 320 according to an embodiment of the invention is illustrated. Narrowband terminal devices communicate with hybrid STM/ATM network 320 through access nodes, such as access node $322_O$ and access node $322_D$. For example, FIG. 3 shows terminals $324_O$ connected to access node $322_O$, particularly ISDN terminal $324_{O-I}$ and PSTN terminal $324_{O-P}$. Similarly, access node $322_D$ has access terminals $324_D$ connected thereto, namely ISDN terminal $324_{D-I}$ and PSTN terminal $324_{D-P}$. Of course, a differing (and most likely greater) number of terminals can be connected to each access node 322, but for simplicity only two such terminals are shown for exemplary purposes in FIG. 3. It should be noted that, as used herein, the term "access node" is not limited to a simple node used merely for connecting subscriber lines, for it may encompass other nodes such as a local exchange (LE) node, for example.

The hybrid STM/ATM network 320 of FIG. 3 comprises one or more STM nodes, also known as PSTN/ISDN nodes 330. While only two such PSTN/ISDN nodes $330_1$ and $330_2$ are shown in FIG. 3 for sake of illustration, it should be understood that the invention is not limited to only two such nodes. The structure and operation of conventional PSTN/ISDN nodes 330 are well known; such as those typified by utilization of Ericsson AXE switches, for example. Therefore, only selected pertinent portions of conventional PSTN/ISDN nodes 330 are described herein with reference to PSTN/ISDN node $330_1$. For example, PSTN/ISDN node $330_1$ has processor(s) 332 which execute, e.g., node application software including switch and resource control software 333. Such software is used to control STM circuit switch 335 as well as signaling terminals 337 which comprise PSTN/ISDN node $330_1$. Other details of the structure and operation of a conventional PSTN/ISDN node are understood, for example, from U.S. patent application Ser. No. 08/601,964 for "Telecommunications Switching Exchange", which is hereby incorporated by reference in its entirety herein.

The STM/ATM network 320 of certain embodiment(s) of the invention is considered a hybrid network in view of the fact that ATM nodes 340 are also included therein. As explained hereinafter, the ATM nodes 340 are used not only to route narrowband traffic between access nodes 322, but also for transport of signaling in ATM cells over an ATM physical interface. In the illustrated example, the ATM network aspect includes two exemplary ATM nodes, particularly ATM node $340_1$ and ATM node $340_2$, which are connected by ATM physical interface or link 341. Again, it should be understood that the ATM component can (and typically does) comprise a greater number of ATM nodes, with the nodes being connected by ATM physical links.

In hybrid network 320, a PSTN/ISDN node 330 and a ATM node 340 can be paired together in the manner illustrated in FIG. 3. With such a pair, the PSTN/ISDN node 330 and ATM node 340 are collectively referred to as hybrid node pair 330/340. The network 320 of certain embodiment(s) of the invention thus can comprise any number of hybrid node pairs 330/340. An ATM node such as ATM node 340 takes on differing configurations, but commonly has a main processor 342 or the like which executes application software including switch and resource control software as generally depicted by 343 in FIG. 3. The heart of an ATM node is usually the ATM switch core or switch fabric, which for the illustrated embodiment is shown as ATM cell switch 345 in FIG. 3. Further information regarding an exemplary ATM switch is provided by U.S. patent application Ser. No. 08/188,101, entitled "Asynchronous Transfer Mode Switch", filed Nov. 9, 1998, which is hereby incorporated by reference in its entirety herein. ATM cell switch 345 has plural ingress ports and plural egress ports, with at least some of such ports having a device board attached thereto.

Each device board at ATM node 340 can have one or more different functions performed thereby or one or more different devices mounted thereon. For example, one of the device boards attached to a port of ATM cell switch 345 can, in one embodiment, have the main processor 342 mounted thereon. Other device boards may have other processors, known as "board processors". Some device boards serve as extension terminals (ETs) 346 which may be used to connect the ATM node to other nodes. For example, the ATM physical link 341 shown in FIG. 3 has a first end connected to an extension terminal ET $346_1$ of ATM node $340_1$, while a second end of ATM physical link 341 is connected to an unillustrated extension terminal ET of ATM node $340_2$. The device boards connected to ATM cell switch 345 of ATM node 340 are not specifically illustrated in detail in FIG. 3, but the structure and operation of such device boards is understood with reference to (for example) the following United States patent applications, all of which are hereby incorporated by reference in their entirety herein: U.S. patent application Ser. No. 08/893,507 for "Augmentation of ATM Cell With Buffering Data"; U.S. patent application Ser. No. 08/893,677 for "Buffering of Point-to-Point and/or Point-to-Multipoint ATM Cells"; U.S. patent application Ser. No. 08/893,479 for "VPNC Look-Up Function"; U.S. patent application Ser. No. 09/188,097 for "Centralized Queuing For ATM Node", filed Nov. 9, 1998.

As explained hereinafter, signaling (e.g., for call setup) is routed from an access node 322 through an ATM node 340 to an appropriate one of the PSTN/ISDN nodes 330. Such being the case, a circuit emulation or translator 350 is provided for each access node 322 which communicates with an ATM node 340. The translators 350 serve, e.g., to encapsulate signaling information from the access node 322 into ATM cells for signaling directed toward an ATM node 340, and conversely unpack ATM payloads received from an ATM node 340 to extract signaling information for use by the access node 322. In this particular illustrated embodiment, the translators 350 are preferably provided at or proximate to their associated access nodes 322. That is, translator $350_O$ may be situated at or included in access node $322_O$; translator $350_D$ may be situated at or included in access node $322_D$. A pair of physical links, shown as links 351, are provided for connecting each access node 322 to a corresponding one of the ATM nodes 340.

ATM node 340 is connected to a PSTN/ISDN node 330 by a physical link 360. With reference to ATM node $340_1$, for example, a pair of switch-to-switch links 360 is employed to connect ATM cell switch 345 (through its circuit emulation board 370) to STM circuit switch 335 of PSTN/ISDN node 330, for the carrying of signaling messages. One of the links in pair 360 carries messages from ATM cell switch 345 (after translation at circuit emulation board 370) to STM circuit switch 335; the other link of the pair 360 carries messages in the reverse direction.

In the illustrated embodiment, a dedicated VPI, VCI internal to ATM cell switch 345 is used for signaling. Thus, with reference to ATM node $340_1$, for example, link $351_O$ is connected to extension terminal (ET) $346_2$, which in turn is connected to a first pair of dedicated ports of ATM cell switch 345. Signaling messages received at ATM node $340_1$ which are destined to PSTN/ISDN node $330_1$ are routed on the dedicated internal VPI/VCI to a port of ATM cell switch 345 which ultimately connects (via circuit emulator 370) to switch-to-switch links 360. However, since the signaling routed through ATM cell switch 345 is encapsulated in ATM cells, a translation to the STM signaling must be performed prior to transmitting the signaling information on switch-to-switch links 360. For this reason, a device board connected to switch-to-switch links 360 has the circuit emulation (CE) or translator 370 mounted thereon.

The circuit emulation (CE) or translator 370 serves to unpack signaling information which is destined to PSTN/ISDN node 330, but contained in ATM cells, so that the signaling information can be extracted from the ATM cells prior to application on switch-to-switch links 360. Conversely, signaling information received from PSTN/ISDN node $330_1$ on switch-to-switch links 360 at translator 370 is encapsulated into ATM cells for routing through ATM node $340_1$. From FIG. 3 it can also be seen that a plurality of interfaces 300a-300f are utilized in the hybrid STM/ATM network 320 of certain embodiment(s) of the invention. These interfaces are described below, primarily with reference to the exemplary nodes (e.g., PSTN/ISDN node $330_1$ and ATM node $340_1$).

Interface 300a is a logical interface which exists between processor(s) 332 of PSTN/ISDN node $330_1$ and main processor(s) 342 of ATM node $340_1$. Interface 300a enables PSTN/ISDN node 330 to control the ATM node 340 connected thereto. That is, with the signaling carried by interface 300a, PSTN/ISDN node $330_1$ can order physical connections which are to be set up in ATM node $340_1$. Interface 300a can be a proprietary interface or an open interface (such as a General Switch Management Protocol (GSMP)

interface [see Request For Comments (RFC) 1987]). Logical interface 300a can be carried on any physical interface, such as interface 360 described below. Alternatively, interface 300a can be carried by a separate link (e.g., between processors 332 and 342), or carried on top of IP/Ethernet links.

Interface 300b is the signaling between the PSTN/ISDN nodes 330 and the access node 322 connected thereto. Interface 300b is carried on one or more semipermanent connections through the STM circuit switch 335; through the interworking unit with circuit emulation 370 into ATM cell switch 345; and over permanent virtual connections to access node 322 (particularly to translator 350 in access node 322, where it is emulated back and terminated). As mentioned above, translator 350 is employed to encapsulate the narrowband signaling from an access node 322 in ATM cells for use by an ATM node 340, and conversely for unpacking ATM cells with signaling information for use by an access node 322. Each STM channel on the user side may have a corresponding VPI/VCI on interface 300b.

Interface 300c is the non-broadband signaling that is carried through and between the nodes. Interface 300c thus carries the normal signaling system No. 7 (SS#7) interface (e.g., TUP or ISUP) which is transparently carried in ATM-cell-formatted versions of signaling messages over ATM physical link 341. In PSTN/ISDN node 330, the signaling terminals 337 are used for common channel signaling. In at least one embodiment, signaling terminals 337 can be pooled devices situated at STM circuit switch 335. Alternatively, the signaling terminals 337 can be connected directly to the interfaces between the STM and ATM switches.

Interface 300d is the physical interface provided by switch-to-switch link 360. Interface 300d can be used to carry speech for a call to and from an STM network, and also to carry the signaling of interface 300b and interface 300c as described herein. In addition, interface 300d can also be used to link-in special equipment that is to be connected to a normal circuit switch (e.g., conference equipment, answering machines, etc.). Interface 300d can be realized by any standard physical media, such as E1, for example; it being understood that STM-1 or similar speeds may be suitable. The physical interface 300d can also carry the voice data for a conversation between any of the terminals shown in FIG. 3 and an unillustrated terminal connected to the circuit switched network, in which situation the hybrid node pair 330/340 acts as a gateway.

Interface 300e is the ATM physical link 341 to other ATM nodes. Any standard link for ATM may be employed for interface 300e. A dedicated VP/VC is employed to transparently transfer the signaling system no. 7 (SS#7) signaling between PSTN/ISDN nodes 330 over interface 300e. Interface 300f, shown in FIG. 3 as connecting each access node 322 with its terminals, is a typical user-network interface (e.g., ISDN, BA/BRA, PRA/PRI, two-wire PSTN, etc.).

For two traditional circuit switched PSTN/ISDN nodes to communicate with one another using protocols such as ISUP or TUP, it is preferable that ISUP entities in both PSTN/ISDN nodes have coordinated data tables. In this regard, each of the two PSTN/ISDN nodes has a table which translates a CIC value onto a same timeslot in a same physical interface connecting the two PSTN/ISDN nodes. Thus, a CIC value (together with a point code) represents a particular timeslot on a particular physical link. One specific CIC preferably points out the same time slot in the tables of both PSTN/ISDN nodes. In other words, the data tables of the two PSTN/ISDN nodes are preferably coordinated.

The need to coordinate the data tables of PSTN/ISDN node $330_1$ and PSTN/ISDN node $330_2$ for ISUP/TUP similarly exists in certain embodiment(s) of the invention. If two hybrid nodes $330_1/340_1$ and $330_2/340_2$ have a communication channel set up between them, by means of a semipermanent connection carrying SS#7 signaling for example, the translation tables 339 in both hybrid nodes are preferably coordinated from the standpoint of using CIC. This typically means that in both hybrid nodes $330_1/340_1$ and $330_2/340_2$ a certain CIC points at the same VP and VC (and possibly AAL2 pointer) identifying cells on a certain physical link (e.g., link 341) connecting the two hybrid nodes. Alternatively, the same objective may be accomplished by other suitable means such as a cross-connected-ATM switch positioned between the hybrid nodes that switches packets and gives the packets the VP and VC value understood by the other node.

Figure 3A:
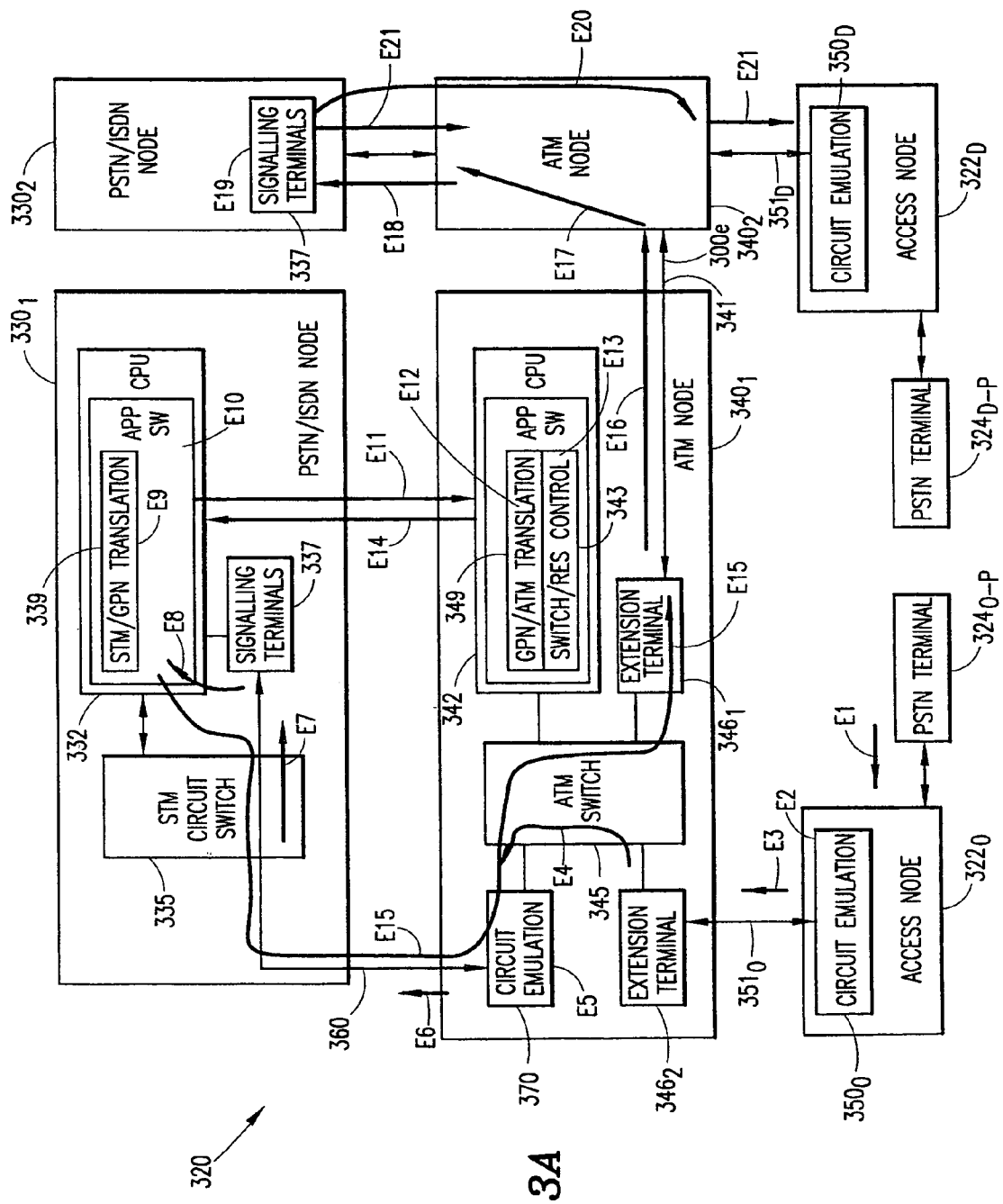
FIG. 3A illustrates an exemplary schematic view of selected portions of the hybrid STM/ATM network of FIG. 3, and further showing various operational events.

Referring now to FIG. 3A, an exemplary structure of hybrid STM/ATM network 320, having omitted therefrom various items including the interfaces, is illustrated. FIG. 3A also provides an example of signal processing for a call originating at terminal $324_{O-P}$ for which the called party number (destination) is terminal $324_{D-P}$. As shown by the arrow labeled E-1, at event E-1 a SETUP message is sent from terminal $324_{O-P}$ to access node $322_O$. In the illustrated embodiment, the SETUP message is an IAM message for an ISUP network interface, and is for a 30B+D PRA and for VS.x carried on a 64 kb/s bit stream in a circuit switched timeslot.

At the translator $350_O$ associated with the access node $322_O$, at event E-2 the signaling from terminal $324_{O-P}$ is converted from STM to ATM by packing the signaling information into ATM cell(s). In this regard, after the circuit emulation a table is employed to translate from a 64 kb/s speech channel from terminal $324_{O-P}$ to a corresponding ATM address (VP/VC). The signaling of the SETUP message, now encapsulated in ATM cell(s), is applied to link $351_O$ and transmitted to ATM cell switch 345 of ATM node $340_1$ as indicated by event E-3. As further indicated by event E-4, the ATM cell(s) containing the SETUP message signaling is routed through the ATM cell switch 345 in accordance with a switch internal VP/VC dedicated for STM-originated signaling. Upon egress from ATM cell switch 345, the signaling information for the SETUP message is retrieved from the ATM cell(s) by translator 370 (event E-5), and it is reconverted at translator 370 from ATM to STM format, so that the SETUP message signaling information can be applied in STM format at event E-6 to switch-to-switch link 360. The SETUP message, now again in STM format, is routed through STM circuit switch 335 (as indicated by event E-7) to an appropriate one of the signaling terminals 337. Upon receipt of the SETUP message signaling information at the appropriate signaling terminal 337, the signaling information is forwarded to processor(s) 332 of PSTN/ISDN node 330, which engage in STM traffic handling (as indicated by event E-8).

In its traffic handling, the processor 332 of PSTN/ISDN node 330 realizes that the incoming side of the call and the outgoing side of the call have physical connections through an ATM node. In this regard, when the access points of the connection were defined (subscriber or network interface), a bearer type was associated with the connection and stored in application software. In the present scenario, when the SETUP message (e.g., an IAM message in the case of an ISUP network interface) was received at PSTN/ISDN node 330, the stored bearer type data was checked in order to determine what switch was on the incoming side to PSTN/

ISDN node 330. Further, the bearer type data stored for the outgoing point (e.g., based on B-Subscriber number) is similarly checked, and if the stored data indicates that both incoming and outgoing sides have an ATM bearer, the PSTN/ISDN node 330 can conclude that ATM node 340 is to be operated (e.g., utilized). In addition, data received in the SETUP message (particularly the B-subscriber number) is analyzed to determine that the called party (destination) terminal $324_{D-P}$ can be reached by contacting PSTN/ISDN node $330_2$. The PSTN/ISDN node $330_1$ realizes that it has an SS#7 signaling interface 300c to PSTN/ISDN node $330_2$, and therefore selects a free CIC (e.g., a CIC not used by any other call) for use toward PSTN/ISDN node $330_2$.

If, on the other hand, the stored bearer type data had indicated an STM bearer, both PSTN/ISDN node 330 and ATM node 340 have to be operated. Thus, PSTN/ISDN node 330 and ATM node 340 collectively function as a gateway between the STM and ATM worlds. Upon realizing that further signaling for the call will be routed through ATM nodes, in the embodiment(s) of the invention shown in FIG. 3 and FIG. 3A, the PSTN/ISDN node $330_1$ makes reference to an STM/GPN translation table 339 maintained by processor(s) 332 (see event E-9). Two translations are performed using the STM/GPN translation table 339. As a first translation, the information (e.g., b-channel and access information in the case of ISDN or CIC plus signaling system #7 point codes in the case of PSTN) contained in the SETUP message is translated to a global position number (GPN). As a second translation, the CIC and destination point code for a circuit leading to hybrid node pair 330/340 is translated to another global position number (GPN).

In connection with the foregoing, the global position number (GPN) is a common way to identify the connection points, and as such is understood by the pair of nodes (PSTN/ISDN node 330 and ATM node 340). In other words, the GPN is an address, or reference, or system internal pointer known by both PSTN/ISDN node 330 and ATM node 340, and used to translate between port/VP/VC and circuit switch address. Usage of GPN in the embodiment of FIG. 3 and FIG. 3A thereby obviates the sending of real addresses between PSTN/ISDN node 330 and ATM node 340. Advantageously, GPN can be shorter, meaning that there is less data to send. For traditional PSTN, the GPN uniquely corresponds to the 64 kbit voice on a two-wire line, but for ISDN, the GPN corresponds to a b-channel (which may be used by several subscribers).

Then, as event E-10, the PSTN/ISDN node 330 generates an ATM switch control message intended to setup a physical connection in ATM node 340. This message of event E-10 contains the two global position numbers (GPNs) obtained from STM/GPN translation table 339 at event E-9, together with an order for the ATM node 340 to connect the two GPN addresses in ATM switch fabric 345. The PSTN/ISDN node 330 sends the switch control message generated at event E-10 to processor 342 of ATM node 340 over interface 300a, as shown by event E-11.

Upon reception of the switch control message sent as event E-11 to ATM node $340_1$, as indicated by event E-12, main processor 342 consults GPN/ATM translation table 349 in order to translate the two global position numbers (GPNs) contained in the event E-10 switch control message into VP/VC/port information understood by ATM node $340_1$. That is, the two global position numbers (GPNs) are used to obtain VP/VC/port information for ultimately reaching both the origination terminal ($324_{O-P}$) and the destination terminal ($324_{D-P}$). Upon successful translation of GPN to ATM, and assuming sufficient resources, processor 342 of ATM node $340_1$ sets up a path through ATM Switch 345 and reserves resources on the port (trunk or link 341) for the call from terminal $324_{O-P}$ to terminal $324_{D-P}$. The path set up and resource reservation activities are accomplished using switch/reservation control 343 and are collectively illustrated as event E-13 in FIG. 3.

Since PSTN/ISDN node 330 preferably knows whether ATM node $340_1$ was successful in performing a GPN/ATM translation, a successful translation message is sent over interface 300a as event E-14 from ATM node $340_1$ to PSTN/ISDN node $330_1$. If the GPN/ATM translation is not successful at ATM node $340_1$, or if there are no available resources at ATM node $340_1$, a call rejection message is sent back to the originating terminal. After PSTN/ISDN node 330 receives the confirmatory message of event E-14 (that ATM switch 345 has been setup and link reservations made (in accordance with event E-13)), at event E-15 the PSTN/ISDN node $330_1$ prepares and sends its further signaling message (e.g., ISUP or TUP) toward the PSTN/ISDN node at the other end (e.g., PSTN/ISDN node $330_2$). This further signaling message is shown as event E-15 in FIG. 3A. The signaling of event E-15 (e.g., an ISUP or TUP message) includes a message transfer part (MTP), and can be sent out on a timeslot (e.g., 64 kb/s) which carries the SS#7 signaling.

As the signaling of event E-15 arrives at ATM node $340_1$, the ATM node $340_1$ prepares its ATM cell-formatted version of the signaling. In particular, the translator 370 puts the signaling information of the signaling of event E-15 into the payload of one or more ATM cells. For example, the translator 370 is configured to take the 64 kb/s signaling information bit stream and to pack it into ATM cells with a predefined VP, VC, and a physical port. As also indicated as event E-15, the ATM cell-formatted version of the further signaling message is routed through ATM cell switch 345 and onto a link indicated by the VP/VC/port information obtained from the translation. In particular, in FIG. 3A the ATM cell-formatted version of the further signaling message is transported on ATM physical link 341, as shown by event E-16.

Upon reaching ATM node $340_2$, the ATM cell-formatted version of the further signaling messages obtains a new internal VPI/VCI for the ATM cell switch 345 of ATM node $340_2$, and is routed (as indicated by event E-17) through ATM cell switch 345 of ATM node $340_2$ to a circuit emulator (not explicitly shown) in ATM node $340_2$, which is analogous to circuit emulator 370 in ATM node $340_1$. The circuit emulator of ATM node $340_2$ performs the conversion from ATM to STM format in like manner as circuit emulator 370 in ATM node $340_1$, and then passes the signaling message to PSTN/ISDN node $330_2$ as event E-18.

In PSTN/ISDN node $330_2$, the ISUP message is received together with the CIC value (from the message transfer part (MTP)) and the B-subscriber number (which is included in the ISUP message). As indicated by event E-19, the second hybrid node $330_2/340_2$ also performs an analysis of the B-subscriber number and concludes that the B-subscriber number is associated with terminal $324_{D-P}$, which involves B channels. The PSTN/ISDN node $330_2$ then selects a B-channel which can be used to reach terminal $324_{D-P}$, or negotiates with the terminal $324_{D-P}$ as to which B-channel to use (depending on the terminal type and protocol type ISDN or PSTN). The PSTN/ISDN node $330_2$ also signals terminal $324_{D-P}$ to activate a ringing signal (as indicated by event E-20). When an answer is received from terminal $324_{D-P}$ (or during or before receiving an answer), the PSTN/ISDN node $330_2$ consults its STM/GPN translation table 339 (not explicitly shown) using a CIC value and a B-channel. The PSTN/ISDN node $330_2$ then operates the ATM switch 345 (not explicitly shown) of ATM node $340_2$ in the same manner as described for ATM node $340_1$, as indicated by event E-21.

Operation of ATM switch 345 of ATM node $340_2$ allows in-band data (e.g., voice data) carried in ATM packets to be passed through the ATM switch. Such operation is accomplished in like manner as described previously hereinabove (e.g., by consulting a table such as table 339, by sending an ATM switch control message, by consulting a table such as table 349, and by setting up of a path in the ATM switch). When an ATM switch is operated as described above, the resulting path through both ATM switches (carrying in-band information) has to be set up in the same way at both ends. This implies that encapsulation of in-band information (which is controlled by circuit emulation (e.g., circuit emulation 370)) at the two end points of the path is preferably set up in the same way. To minimize delay, AAL2 is preferably utilized by circuit emulation 370 for the encapsulation, although other types of protocols may be alternatively used.

As noted hereinabove, a bearer type is associated with a connection and stored in the application software of the PSTN/ISDN node 330. It is presumed that the PSTN/ISDN node 330 already is able to handle traditional access points (subscriber or network interfaces) connected to STM circuit switches. In so doing, the PSTN/ISDN node 330 has logical representations of these existing access points in a static data structure of the PSTN/ISDN node 330. In accordance with certain embodiment(s) of the invention, the PSTN/ISDN node 330 additionally handles access points connected to the ATM switch. In this regard, see (for example) interface 341 of FIG. 3C (hereinafter described). Thus, for certain embodiment(s) of the invention, the PSTN/ISDN node 330 has logical representations of these additional access points in its static data structure. Therefore, the bearer type data may be employed in the prior discussion as a way of distinguishing the logical representation of the additional access points (e.g., ATM-related access points) in the static data structure from the logical representation of the traditional access points.

It was also noted hereinabove that encapsulation of in-band information is preferably set up the same way at both ends. More specifically, a same type of cell filling is preferably employed by two circuit emulation devices that are connected together. For example, if on a link connecting two circuit emulation devices an ATM cell is packed with only one voice sample by a first of the circuit emulation devices, the second of the circuit emulation devices preferably packs ATM cells in a similar manner. Alternatively, another emulation and/or bridging mechanism or scheme may be employed.

In the above regard, filling only part of an ATM cell with information is a technique for reducing delays, although it may increase overhead. Another way of reducing delay is employment of the AAL2 protocol. As understood by those skilled in the art, AAL2 is a protocol layer on top of ATM, and it allows transport of mini-cells within ATM cells. Usage of the smaller AAL2 cells helps address bandwidth and delay problems in the air interface. Certain embodiment(s) of the invention may be utilized with AAL2 switching as an alternative to ATM switching. If one implements AAL2 in certain embodiment(s) of the invention, the switch 345 operates as an AAL2 switch and GPN/ATM translation table 349 in ATM node 340 preferably also includes an AAL2 pointer. Whenever the ingress and egress point is referenced, it can alternately include an AAL2 pointer. Thus, as used herein and in the appended claims, ATM encompasses ATM-related protocols on top of ATM, such as AAL1, AAL2, AAL5, etc. It should also be understood that the term "broadband", as used herein and in the appended claims, embraces and encompasses packet-switched technologies in general (e.g., IP, VoIP, Frame-relay, ATM, etc.).

Figure 3B:
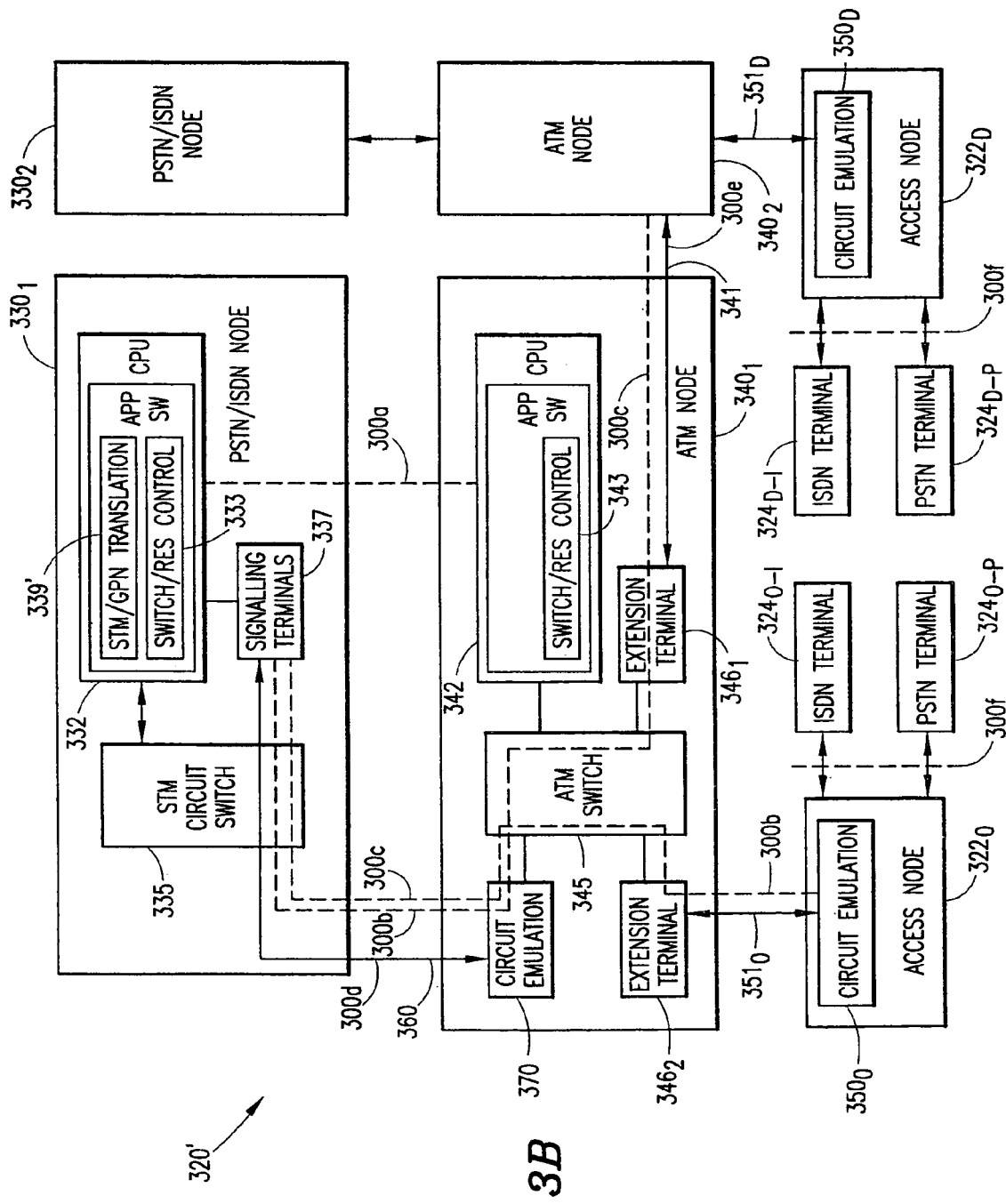
FIG. 3B illustrates an exemplary schematic view of a hybrid STM/ATM network according to another embodiment of the invention.

Referring now to FIG. 3B, an exemplary hybrid STM/ATM network 320' according to another embodiment of the invention is illustrated. The embodiment of FIG. 3B primarily differs from the embodiment of FIG. 3 in that the embodiment of FIG. 3B does not employ global position numbers (GPNs). Rather, the embodiment of FIG. 3B uses an ATM/STM translation table 339' in processor 332 of PSTN/ISDN node $330_1$ instead of an GPN/ATM translation table. In the embodiment of FIG. 3B, the translation tables in the circuit emulation $350_0$ translate the SETUP message from a 64 kb/s speech channel to an ATM address (VP and VC) in a manner similar to that of event E-2 in the embodiment(s) of FIG. 3 and FIG. 3A. After routing of the translated SETUP message through ATM switch $345_1$, the circuit emulation 370 translates the SETUP message to the STM format as occurred at event E-5 of the embodiment(s) of FIG. 3 and FIG. 3A.

The embodiment of FIG. 3B also differs from that of the embodiment(s) of FIG. 3 and FIG. 3A in that processor 332 of PSTN/ISDN node 330 terminates the narrowband signaling by translating a narrowband reference point (e.g., b-channel if an ISDN connection) to a corresponding ATM address for use by ATM node 340. Thus, for the FIG. 3B embodiment, the switch control message of event E-11 sends the ATM VP/VC/port information understood by ATM node $340_1$. Thus, the translation of event E-12 of the FIG. 3/FIG. 3A embodiment is unnecessary in the FIG. 3B embodiment. Rather, upon receiving the ATM VP/VC/port information in the switch control message of event E-11, the embodiment of FIG. 3B proceeds to the path set up and resource reservation operations denoted as event E-13.

The principles as illustrated in the embodiments hereof are also applicable to the carrying of other types of signaling messages in ATM cells. Included among such other types of signaling messages are those destined for the originating terminal (e.g., a call completion signaling message), in which case some of the events described herein are performed essentially in reverse order.

Figure 3C:
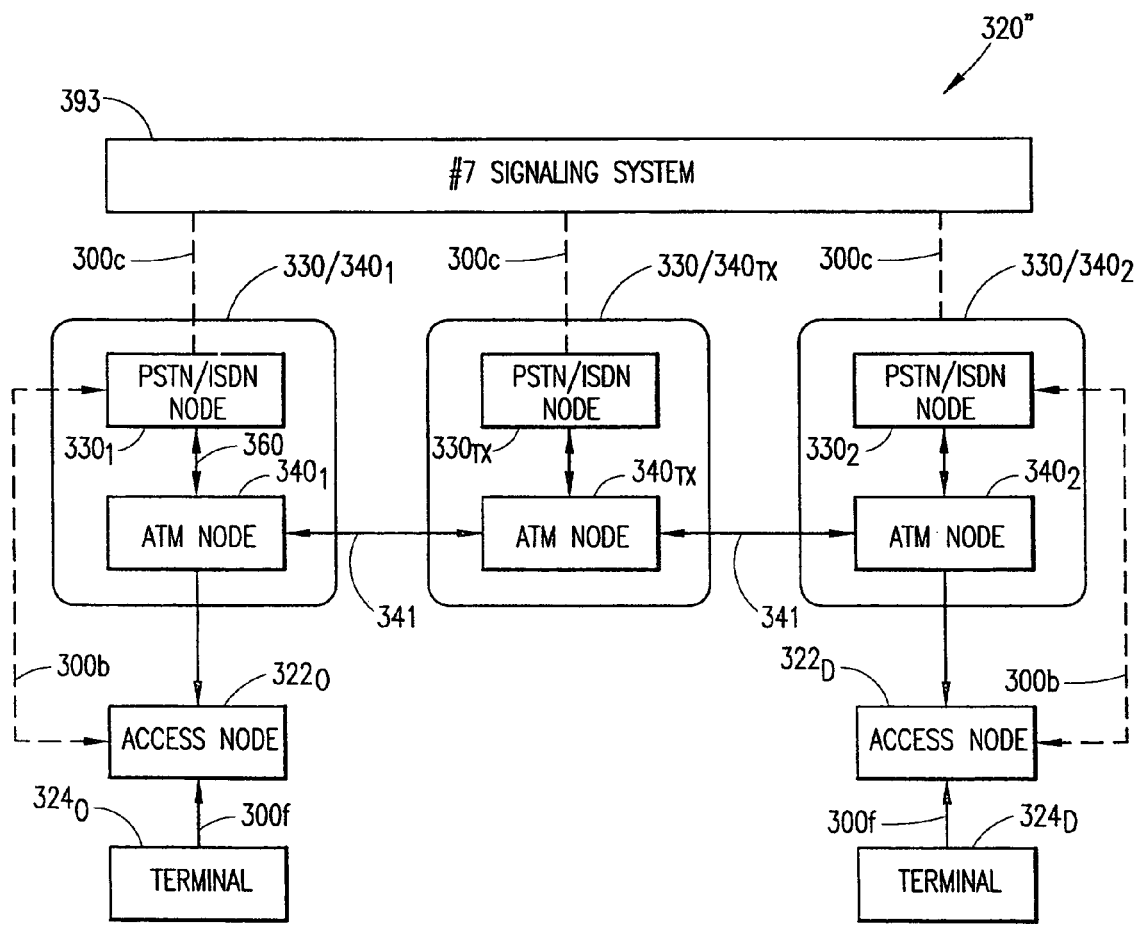
FIG. 3C illustrates an exemplary schematic view showing a transit hybrid node pair of the invention connected between two local exchange hybrid node pairs of the invention.

Referring now to FIG. 3C, an exemplary illustration of how hybrid node pairs 330/340 of the invention may be arranged in an exemplary hybrid STM/ATM network 320" is presented. Network 320" has three node pairs 330/340, including a transit exchange hybrid node pair 330/340$_{TX}$ between two local exchange hybrid node pairs 330/340$_1$ and 330/340$_2$. FIG. 3C shows provision of a "#7 signaling system" 393, which is a logical system carried in the ATM network on an ATM AAL layer as described above. As an alternative embodiment, the "#7 signaling system" 393 may be provided with its own physical network.

Figure 3D:
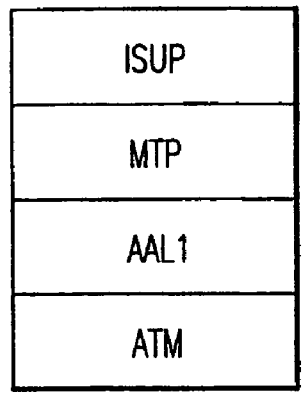
FIG. 3D illustrates a diagrammatic view of an exemplary protocol between two elements of the network of the embodiment(s) of the invention that include hybrid node pairs.

Referring now to FIG. 3D, a diagrammatic view of an exemplary protocol usable between two elements of a network in accordance with embodiment(s) of the invention that include hybrid node pairs is illustrated. The ATM node 340 with its ATM switch 345 terminates the ATM and AAL1 (circuit emulation part) layers; the PSTN/ISDN node 330 terminates the MTP and ISUP layers.

Figure 3E:
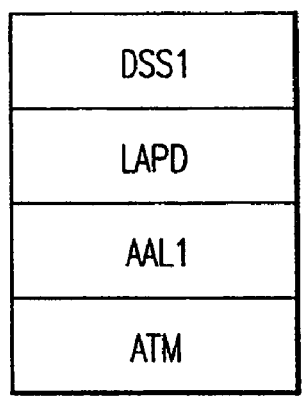
FIGS. 3E, 3F, and 3G illustrate diagrammatic views of alternate exemplary protocols between two elements, a first of the network elements having a hybrid node pair in accordance with embodiment(s) of the invention and a second of the network elements being an access node with an additional ATM interface having circuit emulation.
Figure 3F:
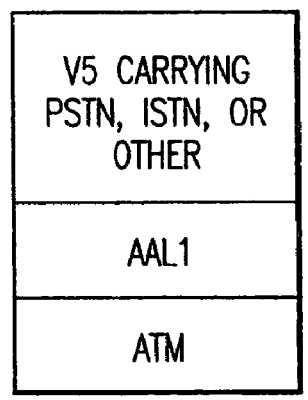
Figure 3G:
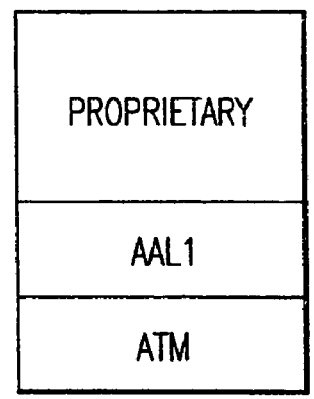

Referring now to FIGS. 3E, 3F, and 3G, diagrammatic views of alternate exemplary protocols between two elements, a first of the network elements having a hybrid node pair in accordance with embodiment(s) of the invention, and a second of the network elements being an access node with an additional ATM interface with circuit emulation is illustrated. In the first network element, the ATM switch 345 terminates the ATM and AAL1 (circuit emulation part) layers, while the layers above are terminated by the PSTN/ISDN node 330. In the second network element, the ATM interface and circuit emulation addition to the access node terminates the ATM and AAL1 layers, while the layers above are terminated by the connected terminal and the access node part. The exemplary protocols of FIGS. 3E, 3F, and 3G can be used, for example, on the interface 300*b*.

Figure 3H:
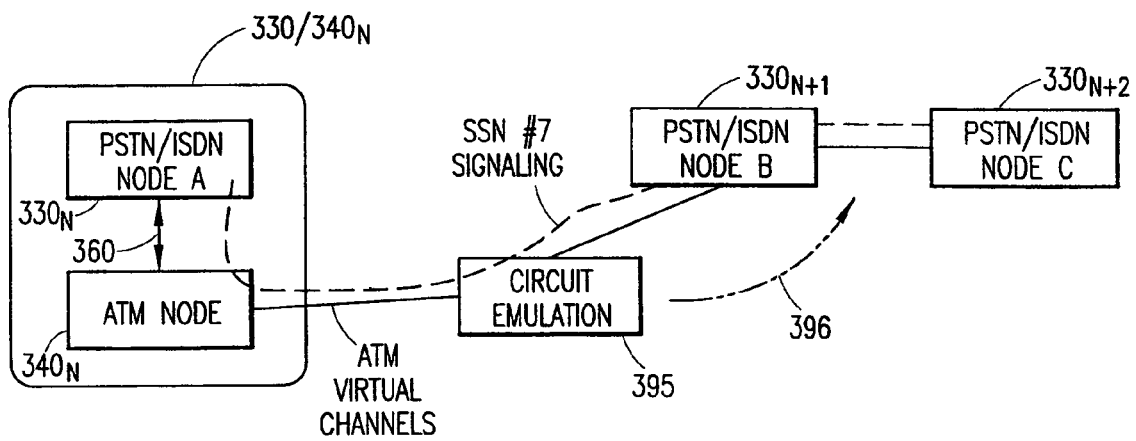
FIG. 3H illustrates an exemplary diagrammatic view showing gradual upgrading of a network from a traditional narrowband STM-transported-and-switched environment into an environment with a hybrid STM/ATM network in accordance with embodiment(s) of the invention.

Referring now to FIG. 3H, an exemplary gradual upgrade of a network from a traditional narrowband STM-transported-and-switched environment into the environment (e.g., hybrid STM/ATM network 320) of certain embodiment(s) of the invention is illustrated. In FIG. 3H, the circuit emulation equipment (translator) 395 separates the hybrid environment from the pure STM environment. If node B (PSTN/ISDN node $330_{N+1}$) is upgraded with ATM switching and (signaling and traffic) transport according to certain embodiment(s) of the invention, the node C (PSTN/ISDN node $330_{N+2}$) is not disturbed if the circuit emulation equipment (translator) 395 is moved in between nodes B and C in the manner illustrated by the dotted-dashed line 396 as shown in FIG. 3H.

Figure 3I:
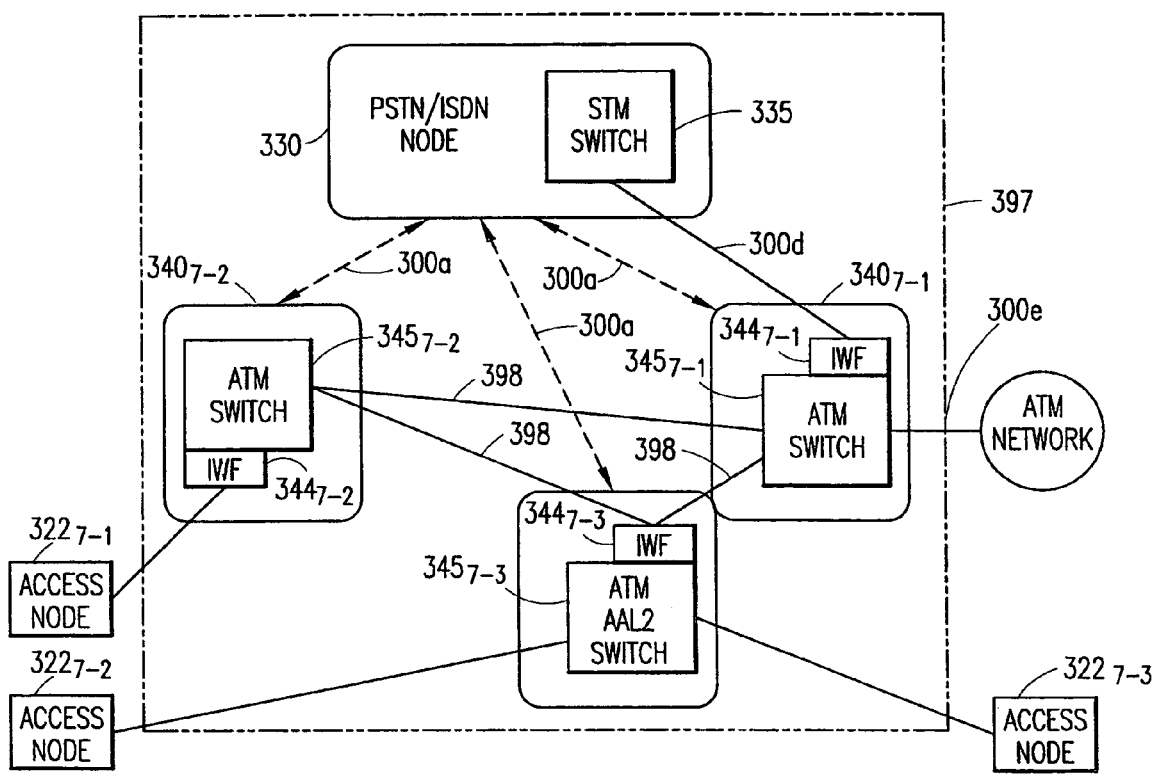
FIG. 3I illustrates an exemplary schematic view showing a multi-switch hybrid node according to yet another embodiment of the invention.

Referring now to FIG. 3I, certain embodiment(s) of the invention permit the possibility of one logical node to include many switches, with switching logic within the node coordinating the setting up of paths through the switches. This logic also inserts interworking functions (IWFs) between switches (if needed), and makes it possible to use resources independent on which switch they are allocated to. For example, the multi-switch node 397 of certain embodiment(s) of the invention includes the PSTN/ISDN node 330 with its STM switch 335, connected by interface 300*d* to ATM node $340_{7-1}$. Specifically, connection is made through IWF $344_{7-1}$ to ATM switch $345_{7-1}$ of ATM node $340_{7-1}$. The ATM switch $345_{7-1}$ of ATM node $340_{7-1}$ is connected by interface 300*e* to an ATM network, as well as to ATM node $340_{7-2}$ and ATM node $340_{7-3}$ included in the multi-switch node 397. The ATM node $340_{7-2}$ has a switch $345_{7-2}$ and an IWF $344_{7-2}$, through which connection can be made with access node $322_{7-1}$. The ATM node $340_{7-3}$ has an ATM AAL2 switch $345_{7-3}$, which connects to ATM nodes $340_{7-1}$ and $340_{7-2}$ through IWF $344_{7-3}$ of ATM node $340_{7-3}$. Access nodes $322_{7-2}$ and $322_{7-3}$ are connected to ATM AAL2 switch $345_{7-3}$ of ATM node $340_{7-3}$.

Certain embodiment(s) of the invention advantageously reuse PSTN and ISDN software in the PSTN/ISDN nodes 330 in a fairly simple way. That is, already-developed narrowband application software residing in the PSTN/ISDN nodes 330 can be utilized, while on-demand ATM connections are used as traffic bearers. The invention thus allows a PSTN/ISDN node such as PSTN/ISDN node 330 to control the call, which facilitates use of well-proven software for various services and functions (e.g., subscriber services, intelligent network (IN) services, Centrex, Charging Customer Care systems, etc.).

ATM is thus used as a transport and switching mechanism in certain embodiment(s) of the invention, while the signaling remains normal narrowband signaling. The narrowband signaling is transported on permanent paths over ATM connections, and the narrowband speech channels are transported on ATM, and switched on a "per call basis" (e.g., on-demand) through an ATM switch.

The narrowband application software executed by processor(s) 332 of PSTN/ISDN nodes 330 thus acts as if operating on its STM circuit switched transport, when in fact it is actually operating on an ATM cell switch. It should be understood that the ATM switch may reside in a separate ATM node or may be integrated in the same node as the STM switch. On a "per call basis", the switching logic in the PSTN/ISDN nodes 330 requests the switching mechanism in the ATM nodes 340 to be set up and disconnected through an ATM cell switch.

It should be understood that variations of the foregoing are within the scope of the embodiments of the invention. For example, the circuit emulation 370 is shown (e.g., in FIG. 3) as being provided on a device board of ATM node 340. Alternatively, circuit emulation 370 may be located elsewhere, such as (for example) on link 360 between PSTN/ISDN node 330 and ATM node 340, or even included in PSTN/ISDN node 330 (e.g., at either end of interface 300*d*). While various processors, such as processors 332 and 342, have been illustrated as single processors, it should be understood that the functionality of such processors may be situated or distributed in different ways (e.g., distributed over several processors to achieve, e.g., scalability in respect to processing capacity and reliability), for example.

In the foregoing examples, the SETUP message (received at the STM node in STM format) is routed through STM circuit switch 335 as indicated by the event E-8 to signaling terminals 337. It should be understood, however, that depending upon implementation in an PSTN/ISDN node, signaling may take another way to reach a signaling terminal (e.g., other than through a switch). The invention also describes a system with one STM switch and one ATM switch associated with one another. This particular configuration is advantageous in that resources which take care of certain kinds of signals (e.g., in-band signals) may be situated in the STM switch and be used also for the ATM transported calls. This is also a way of reusing the installed base, if such exists. Also, certain embodiment(s) of the invention can perform switching on various levels, such as the AAL2 level and with mini-cells, which tends to reduce any delay/echo problems.

The invention thus pertains to the telecommunications world and an attempt to introduce ATM to a telecommunications network. The invention addresses the situation in which a circuit switched telephony network pre-exists, and it is to be augmented or partially replaced by parts that employ ATM for transport and switching. Certain embodiment(s) of the invention need not employ broadband signaling, but rather narrowband signaling with the bearer part of the call following the signaling to the same extent as in a traditional narrowband circuit switched network.

As described herein, ATM may be used as a transport and switching mechanism in a hybrid STM/ATM network, while the signaling remains normal narrowband signaling. The narrowband signaling may be transported on permanent paths over ATM connections, and the narrowband speech channels may be transported on ATM and switched on a "per call basis" (e.g., on-demand) through an ATM switch. The hybrid STM/ATM network may include an access node that services narrowband terminals and which generates a signaling message in connection with call setup. A translator formats the first signaling message into ATM cells so that the first signaling message may be routed through an ATM switch to a circuit switched (e.g., STM) node. The circuit switched node (e.g., PSTN/ISDN) sets up a physical connection for the call and generates a further signaling message for the call, the further signaling message pertaining to the physical connection. The ATM switch routes an ATM cell-formatted version of the further signaling message to another ATM switch over an ATM physical interface. Thus, the ATM switch switches both narrowband traffic and signaling for the call over the ATM physical interface.

Figure 4:
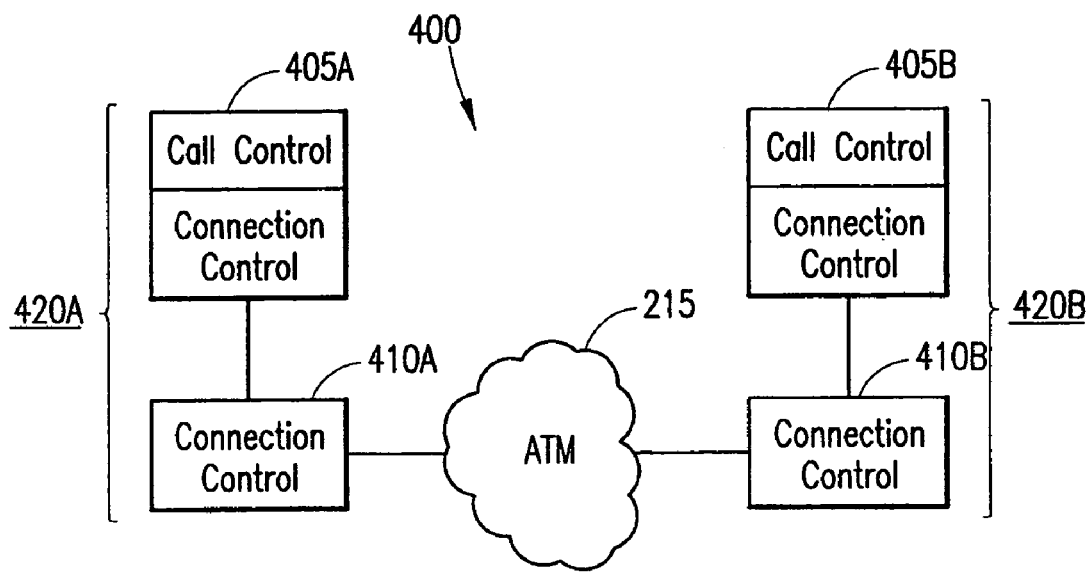
FIG. 4 illustrates another exemplary scheme for utilizing a broadband network in conjunction with nodes having partially separated functions in accordance with the present invention.

Referring now to FIG. 4, another exemplary scheme for utilizing a broadband network in conjunction with nodes having partially separated functions in accordance with the present invention is illustrated generally at 400. The nodes 405A, 405B are connected to the nodes 410A, 410B. The nodes 405A, 405B each include both call control functions and connection control functions. In effect, each of the nodes 405A, 405B (e.g., which may correspond to, for example, PSTN/ISDN nodes 330 of the embodiment(s) of FIG. 3 et seq.) include both switching intelligence (e.g., which may correspond to, for example, one or more of processor(s) 332, switch and resource control software 333, signaling terminals 337, and STM/GPN translation table 339 of the embodiment(s) of FIG. 3 et seq.) and switching fabric (e.g., which may correspond to, for example, an STM circuit switch 335 of the embodiment(s) of FIG. 3 et seq.). While the nodes 410A, 410B include connection control functions, they rely on the call control functions of the nodes 405A, 405B to which they are respectively connected. In effect, each of the nodes 410A, 410B (e.g., which may correspond to, for example, ATM nodes 340 of the embodiment(s) of FIG. 3 et seq.) include switching fabric (e.g., which may correspond to, for example, an ATM cell switch 345 of the embodiment(s) of FIG. 3 et seq.). The nodes 410A, 410B, which are also connected to an ATM network 215, effect required emulation and cell packing for interworking a narrowband network (not shown) with the ATM network 215.

Generally, and in certain embodiment(s), call control involves features, functions, responsibilities, etc. pertaining to one or more of the following: routing a call; signaling between narrowband nodes; providing subscriber services; implementing charging; determining the connection and/or activation of tone senders, answering machines (e.g., voice mail), echo cancelers, and other types of telephony resources and/or equipment; ascertaining the desirability and/or necessity of utilizing an IN service; etc. Connection control, on the other hand, involves features, functions, responsibilities, etc. pertaining to setting up/establishing a connection between two (or among/across multiple) physical points within a switch and/or over a network responsive to call control, for example. The connection control, to effectuate such a connection, may rely on some type of signaling of the bearer network (e.g., UNI, PNNI, B-ISUP, etc.)

In accordance with certain embodiment(s) of the present invention, the nodes 405A, 405B may be advantageously realized using, at least partly, a modified version of an existing/legacy telecommunications switch. Using an existing telecommunications switch advantageously obviates any need to create code "from scratch" for the myriad of advanced calling features that are already supported by the existing telecommunications switch. Furthermore, in accordance with certain principles of the present invention, using an existing telecommunications switch enables a gradual migration to a broadband transport mechanism such as ATM. A call/connection control node 405A, 405B and a respective connection control node 410A, 410B pair together form a hybrid switch 420A/420B.

Figure 5:
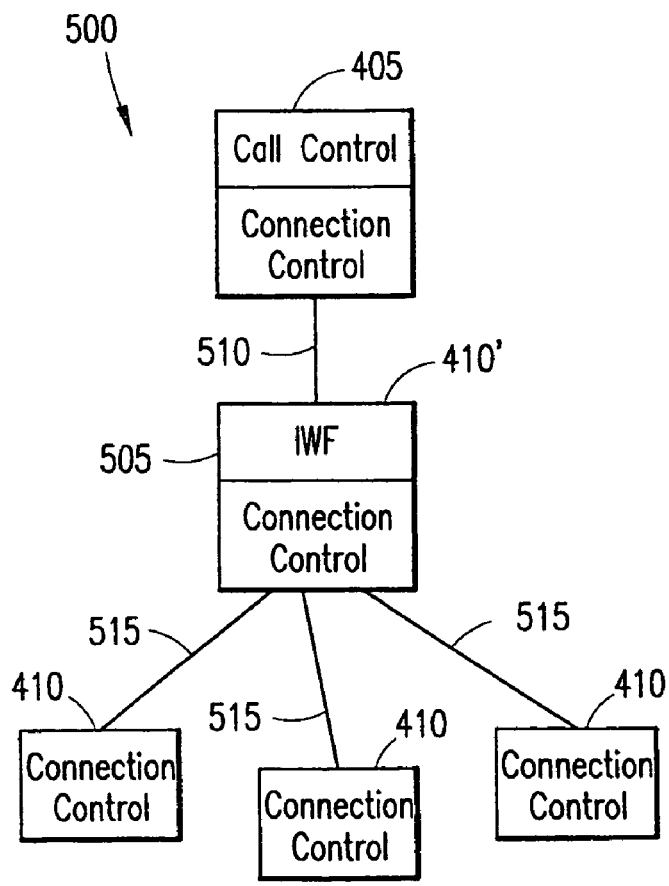
FIG. 5 illustrates an exemplary tri-level nodal environment in accordance with the present invention.

Referring now to FIG. 5, an exemplary tri-level nodal environment in accordance with the present invention is illustrated generally at 500. A call/connection control node 405 (e.g., which may correspond to, for example, PSTN/ISDN nodes 330 of the embodiment(s) of FIG. 3 et seq.) is illustrated connected to a modified connection control node 410' (e.g., which may correspond to, for example, ATM node $340_{7-1}$ of the embodiment(s) of FIG. 3 et seq.) via line 510 (e.g., which may correspond to, for example, interface 300a and/or interface 300d of the embodiment(s) of FIG. 3 et seq.). The modified connection control node 410', in the exemplary tri-level nodal environment 500, includes an interworking function (IWF) 505 (e.g., which may correspond to, for example, an IWF $344_{7-1}$ of the embodiment(s) of FIG. 3 et seq.). The IWF 505 may be composed of, for example, hardware, software, firmware, some combination thereof, etc.

The IWF 505 may include emulation and mapping capabilities. For example, the IWF 505 may include the ability to emulate a switch interface for the call/connection control node 405. Advantageously, this eliminates any absolute requirement to modify the call/connection control node 405 because the call/connection control node 405 is able to act and interact as if it is functioning within a traditional telecommunications network. The IWF 505 may also include the ability to map/translate one network address into or to another network address. The modified connection control node 410' is illustrated connected to multiple connection control nodes 410 (e.g., which may correspond to, for example, ATM node $340_{7-2}$, ATM node $340_{7-3}$, etc. of the embodiment(s) of FIG. 3 et seq.) via lines 515 (e.g., which may correspond to, for example, interfaces 300a and/or interfaces 398 of the embodiment(s) of FIG. 3 et seq.). In the exemplary tri-level nodal environment 500, the call/connection control node 405 may advantageously provide/share its switching intelligence with more than one connection control node 410. It should be understood that the various nodes may be physically co-located, physically separated, etc.

Referring now to FIG. 5A, a first exemplary tri-level nodal environment alternative in accordance with the present invention is illustrated generally at 525. In the first exemplary tri-level nodal environment alternative 525, the call/connection control node 405 is in communication with the modified connection control node 410' via a first line 530 and a second line 535. The first line 530 and the second line 535 may be used for communicating signaling information and data information, respectively, between the call/connection control node 405 and the modified connection control node 410', which has the IWF 505. Also illustrated in the first exemplary tri-level nodal environment alternative 525 is an ATM network 215 cloud interconnecting the modified connection control node 410' and the connection control nodes 410. In other words, the modified connection control node 410' need not employ direct and dedicated links to the individual connection control nodes 410. It should be understood that the ATM network 215 may alternatively be realized as any circuit-switched network.

Referring now to FIG. 5B, a second exemplary tri-level nodal environment alternative in accordance with the present invention is illustrated generally at 550. In the second exemplary tri-level nodal environment alternative 550, a "streamlined" tri-level nodal environment is illustrated. The modified call control node 405' does not include connection control (e.g., it was designed and built without such connection control, it had its connection control removed or rendered inoperable, etc.), and no single connection control is directly associated with (or co-located with) the IWF (node) 505. The switching intelligence of the modified call control node 405' operates in a first address space, which is designated address space A 555. The switching fabric of the multiple connection control nodes 410, on the other hand, operate in a second address space, which is designated address space B 560. The IWF 505 maps/translates the addresses of the address space A 555 to the addresses of the address space B 560 so as to enable the switching intelligence of the modified call control node 405' to provide call control to the switching fabric of the multiple connection control nodes 410.

It should be understood that while the address spaces A 555 and B 560 are illustrated only in the second exemplary tri-level nodal environment alternative 550, they are also applicable to the exemplary tri-level nodal environment 500 as well as the first exemplary tri-level nodal environment alternative 525. It should also be understood that the different aspects illustrated in the various embodiments of FIGS. 5, 5A, and 5B may be interchanged without departing from the present invention. For example, a circuit-switched network cloud (e.g., the ATM network 215) may interconnect the multiple connection control nodes 410 in any or all embodiments embraced by the present invention.

Referring now to FIG. 5C, an exemplary interworking function in accordance with the present invention is illustrated at 505. The IWF 505 includes an emulator 580 and a mapper (or translator) 585. The emulator 580 emulates an interface to which the call/connection control node 405 "expects" to be connected. In other words, the emulator 580 may provide an interface that the call/connection control node 405 is already designed to utilize and/or interact with. Advantageously, this eliminates or minimizes or at least reduces the need to modify the call/connection control node 405. It should be noted that the interface may be equivalent to a group switch (GS) input/output (I/O), E1/T1 trunk lines, etc. The mapper 585 provides a mapping (or more generally a correspondence) between addresses of a first address space and addresses of a second address space.

The mapper may map (or more generally a correspondence may be established between) address space A 555 (of FIG. 5B) to the address space B 560. For example, one or more of the addresses A1 . . . An of the address space A 555 may be mapped to one or more of the addresses B1 . . . Bn of the address space B 560. As a specific instance, the address A3 may be mapped to the address B1. In exemplary embodiment(s), the address space A 555 may include 10-digit B-numbers, and the address space B 560 may include ATM identifiers such as VPIs and VCIs. Other exemplary address space realizations are also embraced by the present invention.

Figure 6:
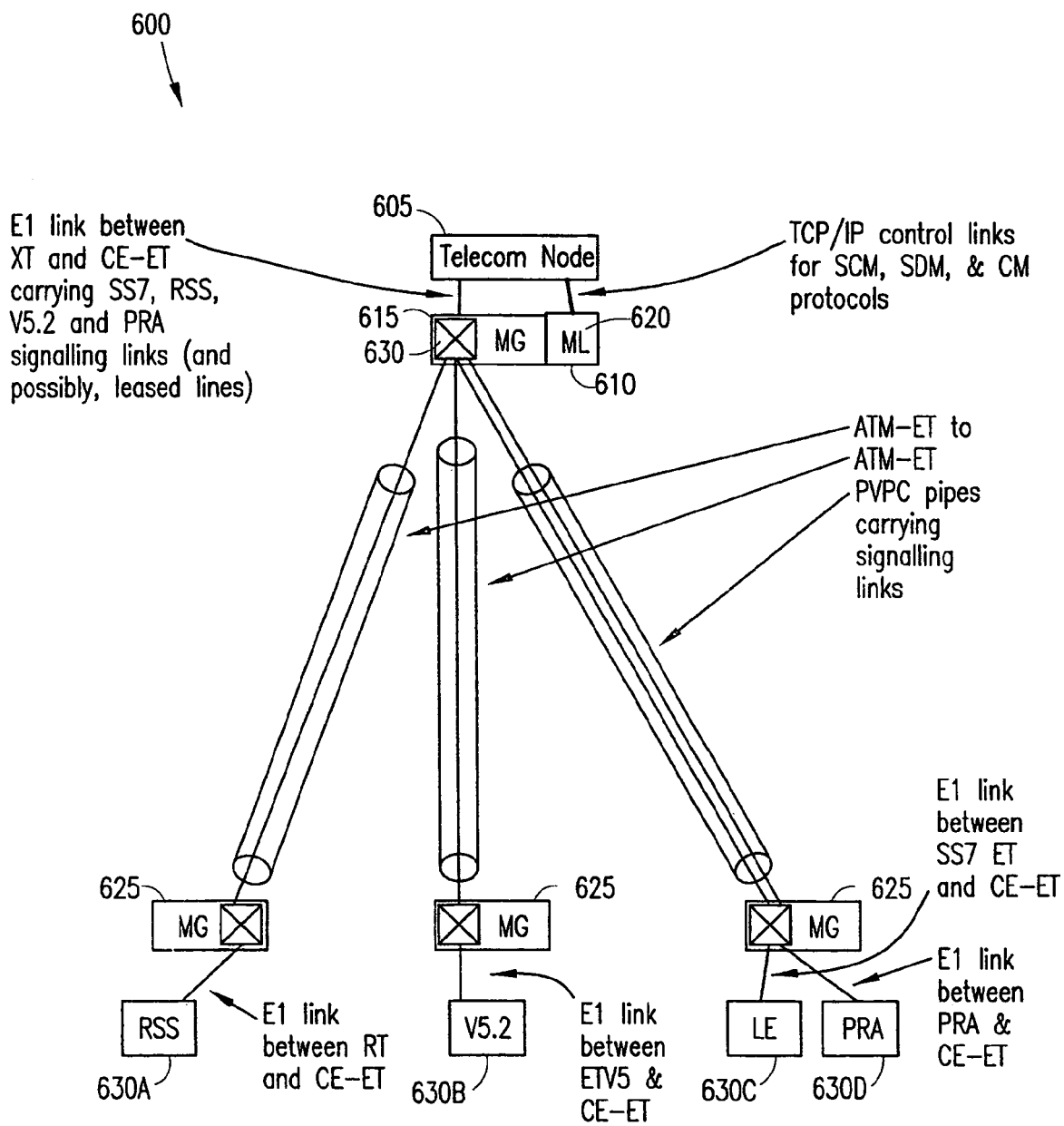
FIG. 6 illustrates an exemplary tri-level nodal environment implementation in accordance with the present invention.

Referring now to FIG. 6, an exemplary tri-level nodal environment implementation in accordance with the present invention is illustrated generally at 600. A telecommunications node (TN) 605 (e.g., which may correspond to, for example, a call/connection control node 405 of the embodiment(s) of FIG. 5 et seq.) is shown connected to media gateway functionality 610 (e.g., which may correspond to, for example, a modified connection control node 410' of the embodiment(s) of FIG. 5 et seq.). The TN (a.k.a. legacy switch (LS)) 605 may have a circuit switch such as a GS (not explicitly shown in FIG. 6). The media gateway functionality 610 may include a media gateway (MG) 615, which may have a packet switch such as an ATM switch 640, and mediation logic (ML) 620 (e.g., which may correspond to, for example, an IWF 505 of the embodiment(s) of FIG. 5 et seq.).

The media gateway functionality 610 is illustrated as being connected to multiple MGs 625 (e.g., which may correspond to, for example, the multiple connection control nodes 410 of the embodiment(s) of FIG. 5 et seq.). Each of the MGs 625 may be responsible for handling one or more different types of media. The media, and nodes corresponding thereto, may include, for example, a remote subscriber switch (RSS) node 630A, a V5.2 interface access network (V5.2) node 630B, a local exchange (LE) node 630C, a primary rate access (PRA) node 630D, etc. An MG 625 (or an MG 615) may convert media provided in one type of network to the format requirements of another type of network.

Exemplary and/or appropriate protocols for the links between the various illustrated nodes (including the gateways) are illustrated at the exemplary tri-level nodal environment implementation 600. As an explanatory example, the connections between the media gateway functionality 610 and the multiple MGs 625 may be ATM-ET to ATM-ET PVPC pipes defined through an ATM network to carry signaling information. A PVPC is an ATM connection in which the switching is performed only on the VPI field of each cell. A PVPC is termed "permanent" because it is provisioned through a network management function and maintained (or left up) indefinitely. The signaling information between the media gateway functionality 610 and any one or more of the MGs 625 may be effectuated transparently over a PVPC pipe. Such a PVPC pipe is at least similar to one establishable through the switching fabric of a connection control node 410 for transparently piping signaling information to the switching intelligence of a call/connection control node 405 (as alluded to hereinabove with reference to FIG. 3 et seq.).

Figure 7A:
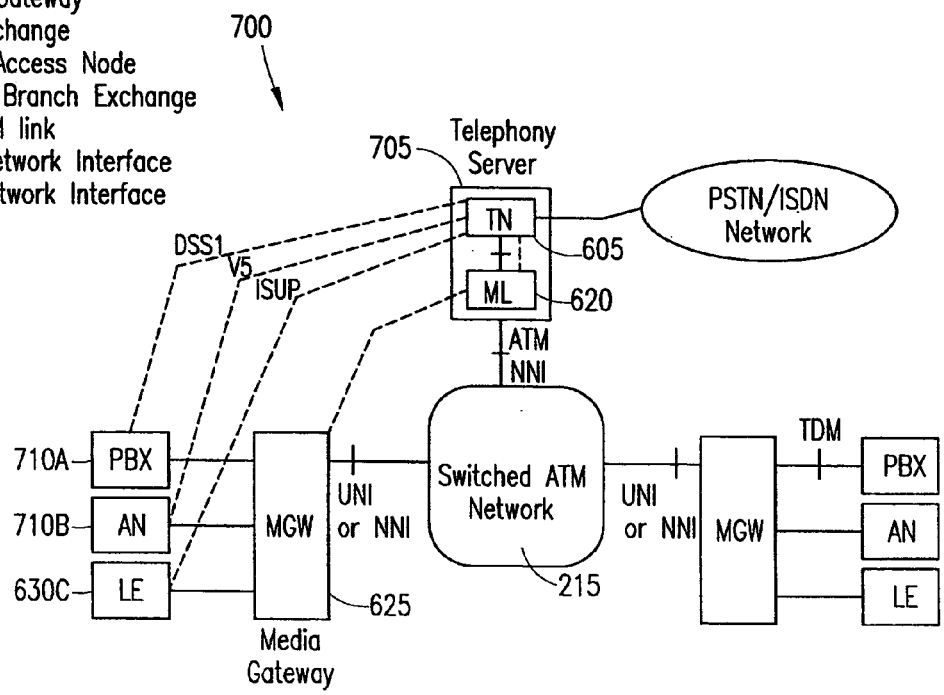
FIGS. 7A and 7B illustrate two other exemplary tri-level nodal environment implementations in accordance with the present invention.
Figure 7B:
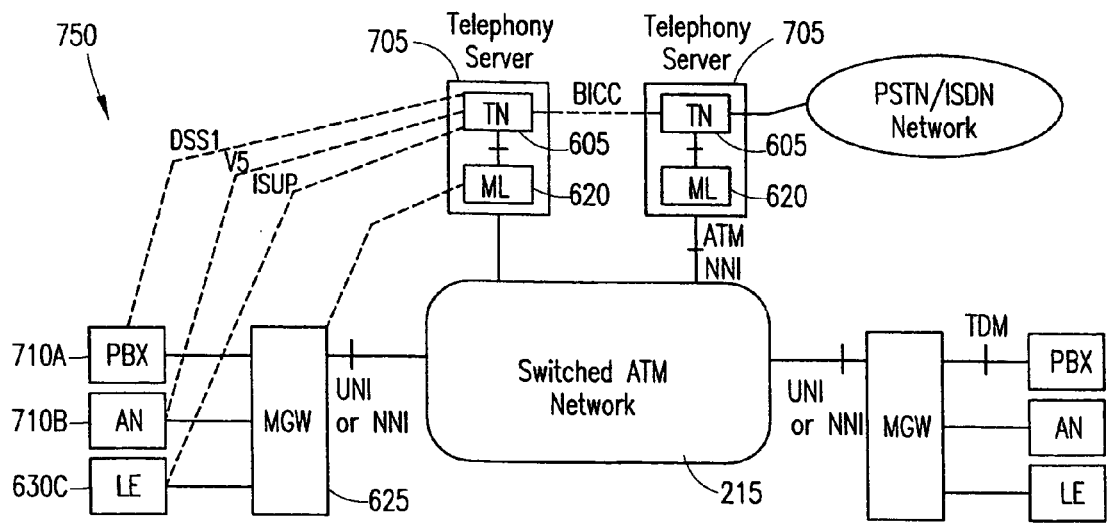

Referring now to FIGS. 7A and 7B, two other exemplary tri-level nodal environment implementations in accordance with the present invention are illustrated generally at 700 and 750, respectively. The exemplary tri-level nodal environment implementations 700 and 750 include telephony servers 705. The telephony servers 705 each include a TN 605 and ML 620. Each telephony server 705 may control one or more MGs 625 (denoted as "MGW" in FIGS. 7A and 7B) via the packet-switched network cloud, such as an ATM network 215. Each telephony server 705, being based on pre-existing TNs 605 in certain exemplary embodiment(s), may only handle a finite number of MGs 625. Accordingly, a given tri-level nodal environment may need more than one telephony server 705, as indicated by the two telephony servers 705 illustrated in the exemplary tri-level nodal environment implementation 750.

The bearer services for call data information are provided by the packet-switched broadband network (e.g., via encapsulation), and the telecommunications services/call control may be transported over this packet-switched (broadband) network in an un-modified format (e.g., transparently in pipes), as indicated by the dashed lines. For example, control communications to the private branch exchange (PBX) nodes 710A are effectuated using DSS1, control communications to the generic access nodes (AN) 710B are effectuated using V.5, and control communications to the LE nodes 630C are effectuated using ISUP. Likewise or similarly, the two telephony servers 705 may communicate therebetween using a bearer independent call control (BICC) protocol that may be transported over the packet-switched network. It should be emphasized that TDM as used herein, encompasses and embraces time-division multiplexed protocols in general, and it is not limited to any particular TDM protocol, including the exemplary 2M PCM link definition of FIGS. 7A and 7B.

Figure 8A:
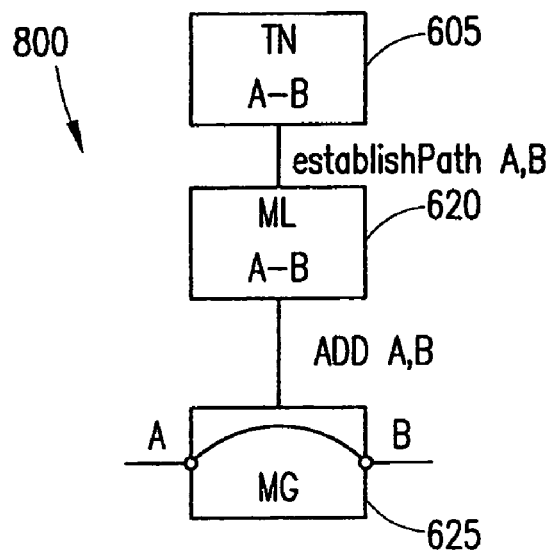
FIGS. 8A and 8B illustrate two exemplary call setups in an exemplary tri-level nodal environment implementation in accordance with the present invention.
Figure 8B:
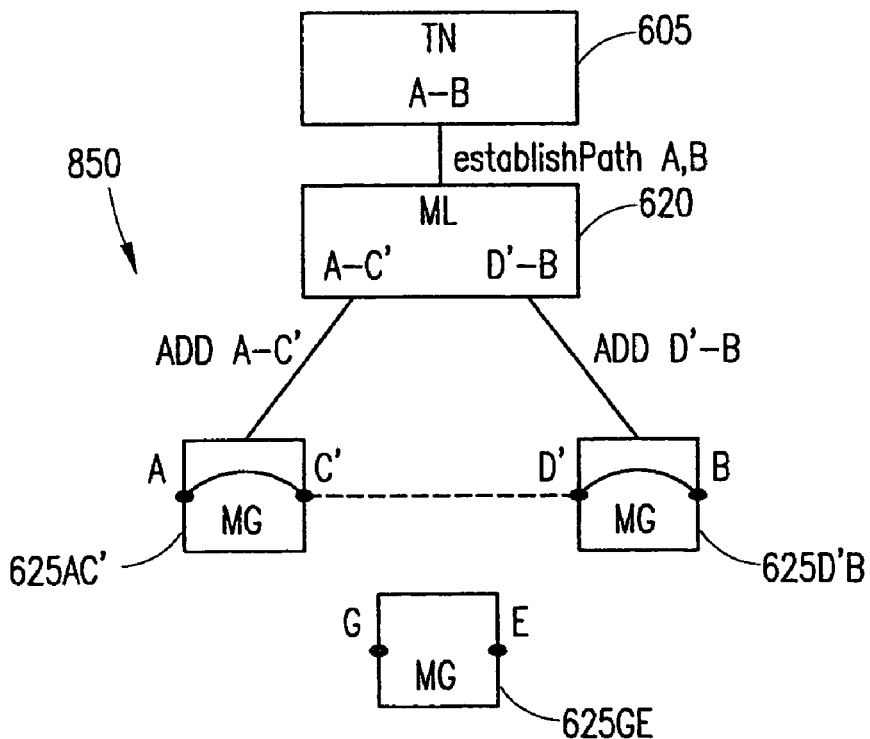

With reference now to FIGS. 8A and 8B, two exemplary call setups in an exemplary tri-level nodal environment implementation in accordance with the present invention are illustrated generally at 800 and 850, respectively. In the exemplary call setup 800, a TN 605 determines that a communication path between points A and B are needed for a call. The TN 605 therefore instructs the ML 620 to establish a path between the points A and B. The instruction may include direction(s) for establishing such a path in a TDM network. The ML 620, applying the points A and B and/or the direction(s) to a mapping data structure for example, determines how to establish a communication path between points A and B. The ML 620 then instructs/requires that such a communication path be established (e.g., added) in the broadband network of which the MG 625 is a part. In the exemplary call setup 800, an intra MG call setup case is illustrated, so the single MG 625 that is illustrated is capable of establishing the communication path.

In the exemplary call setup 850, on the other hand, a multi-MG (but intra domain) call setup case is illustrated, so more than a single MG 625 is required to establish the communication path. Specifically, after the ML 620 receives the instruction (and possibly the direction(s)) from the TN 605, the ML 620 determines that the communication path needs to extend between at least two MGs 625. Namely, the MGs 625 that include the points A and B need to be interconnected, optionally with no intervening MG(s) 625. In the exemplary call setup 850, the ML 1620 then instructs/requires that such an interconnection for the communication path be established (e.g., added) in the broadband network between the MG 625AC' and the MG 625D'B, as indicated by the dashed line. The MGs 625AC' and 625D'B also complete the communication path between point A and point B by establishing interconnections between points A and C' and points D' and B, respectively. By determining a communication path and/or instituting a routing of a communication path between point A and point B through a packet-switched (broadband) network, the ML 620 effectively maps from one address space to another address space.

Figure 9:
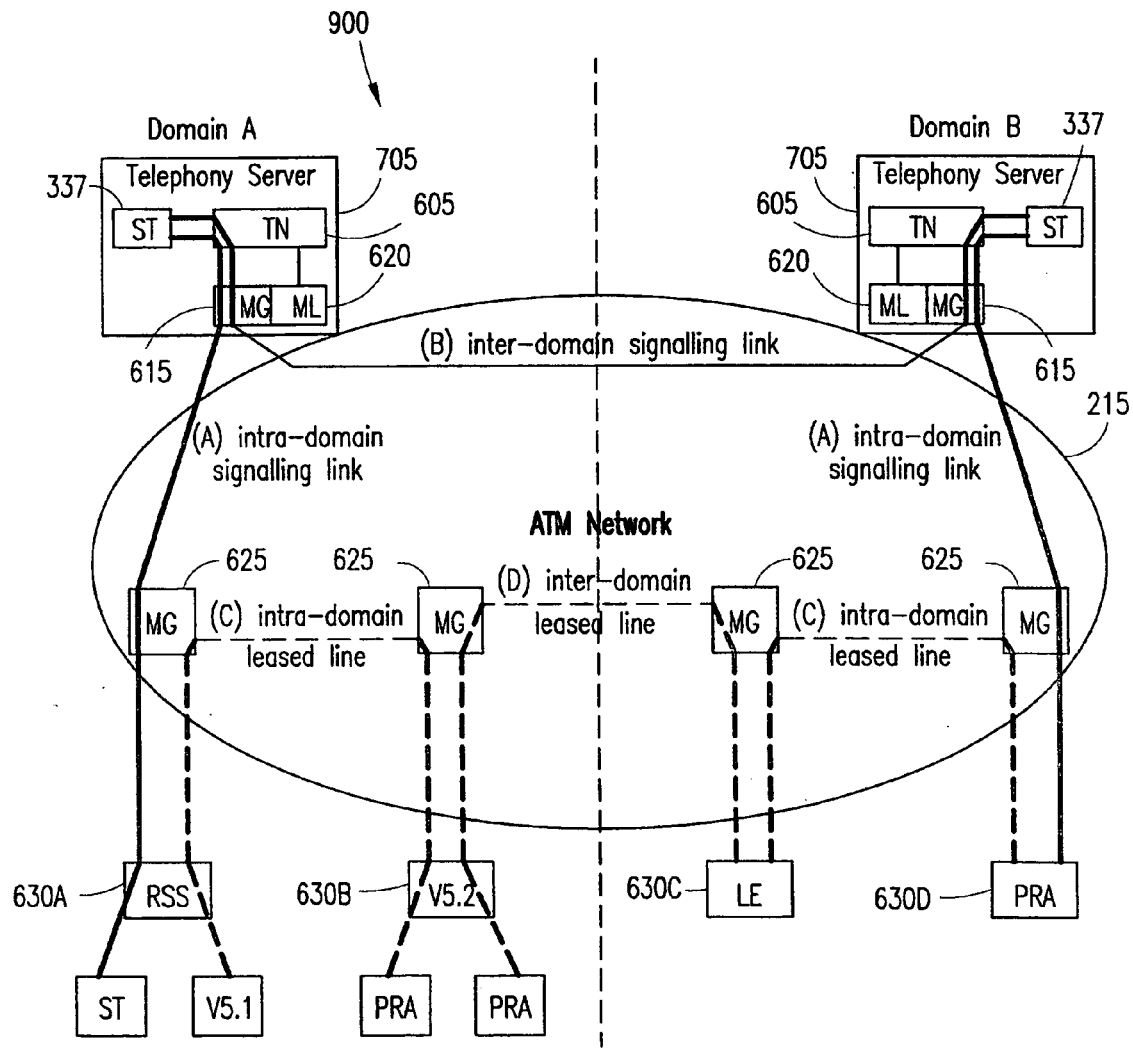
FIG. 9 illustrates exemplary communication path configuring in an exemplary tri-level nodal network in accordance with the present invention.

Referring now to FIG. 9, exemplary communication path configuring in an exemplary tri-level nodal network in accordance with the present invention is illustrated generally at 900. The entities responsible for configuring various communication paths in the exemplary tri-level nodal network 900 are indicated by the type of line (e.g., solid, dashed, thick, thin, etc.) illustrating/representing the particular communication path. The signaling link parts represented by the solid thick lines (also labeled "(A)") are configured by TN 605 commands. The signaling link parts represented by the solid thin lines (also labeled "(B)") are configured by ATM management system commands. The leased line parts represented by the dashed thick lines are configured by TN 605 commands. The leased line parts represented by the dashed thin lines (also labeled "(C)" and "(D)") are configured by ATM management system commands. The parts labeled "(A)" and "(C)" pertain to intra-domain segments while the parts labeled "(B)" and "(D)" pertain to inter-domain segments. It should be noted that segments within the ATM network are configured by the ATM management system commands while segments extending beyond the ATM network are configured by TN 605 commands in the exemplary communication path configuring of the exemplary tri-level nodal network 900.

Figure 10A:
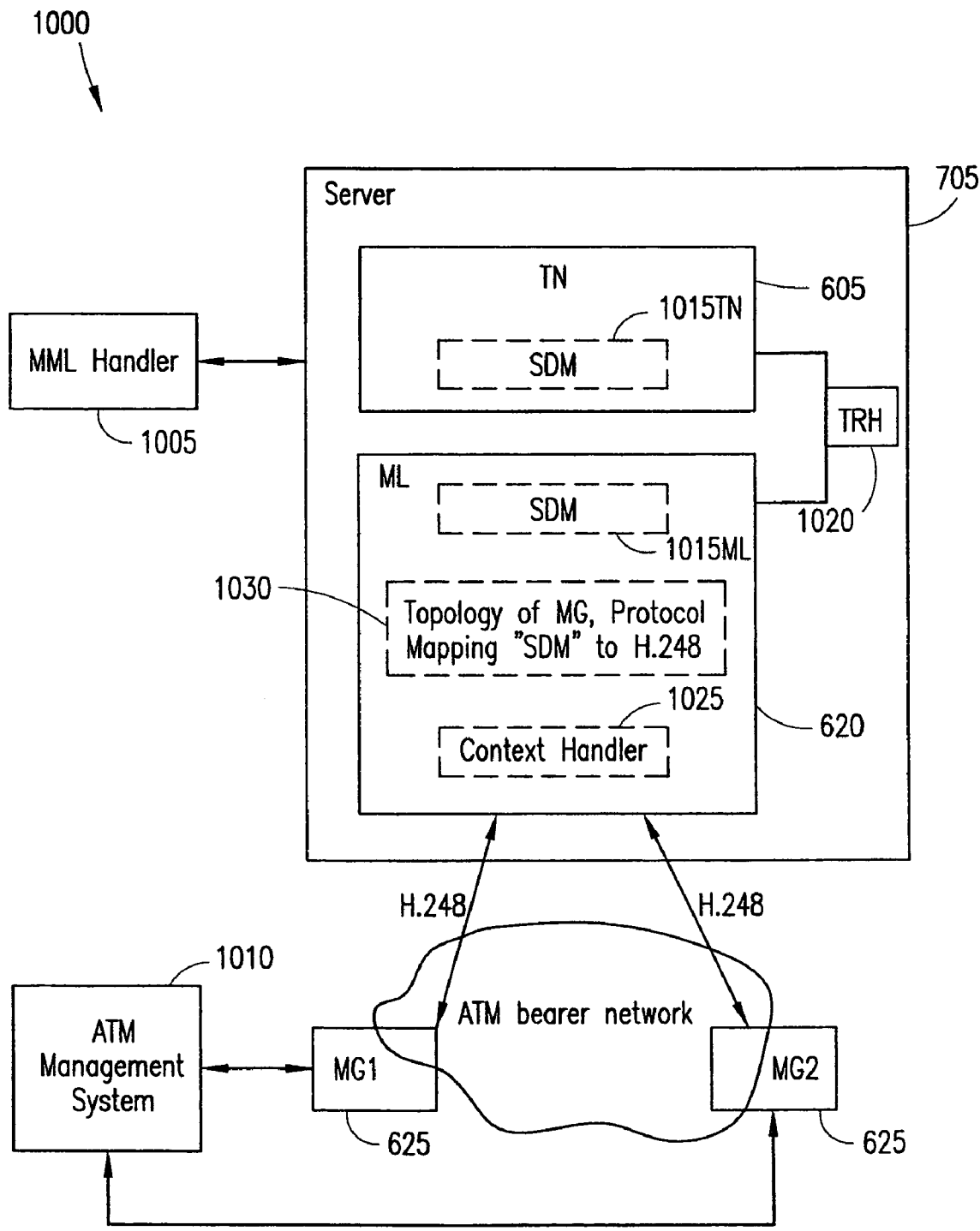
FIGS. 10A and 10B illustrate exemplary mapping embodiments in an exemplary tri-level nodal environment implementation in accordance with the present invention.
Figure 10B:
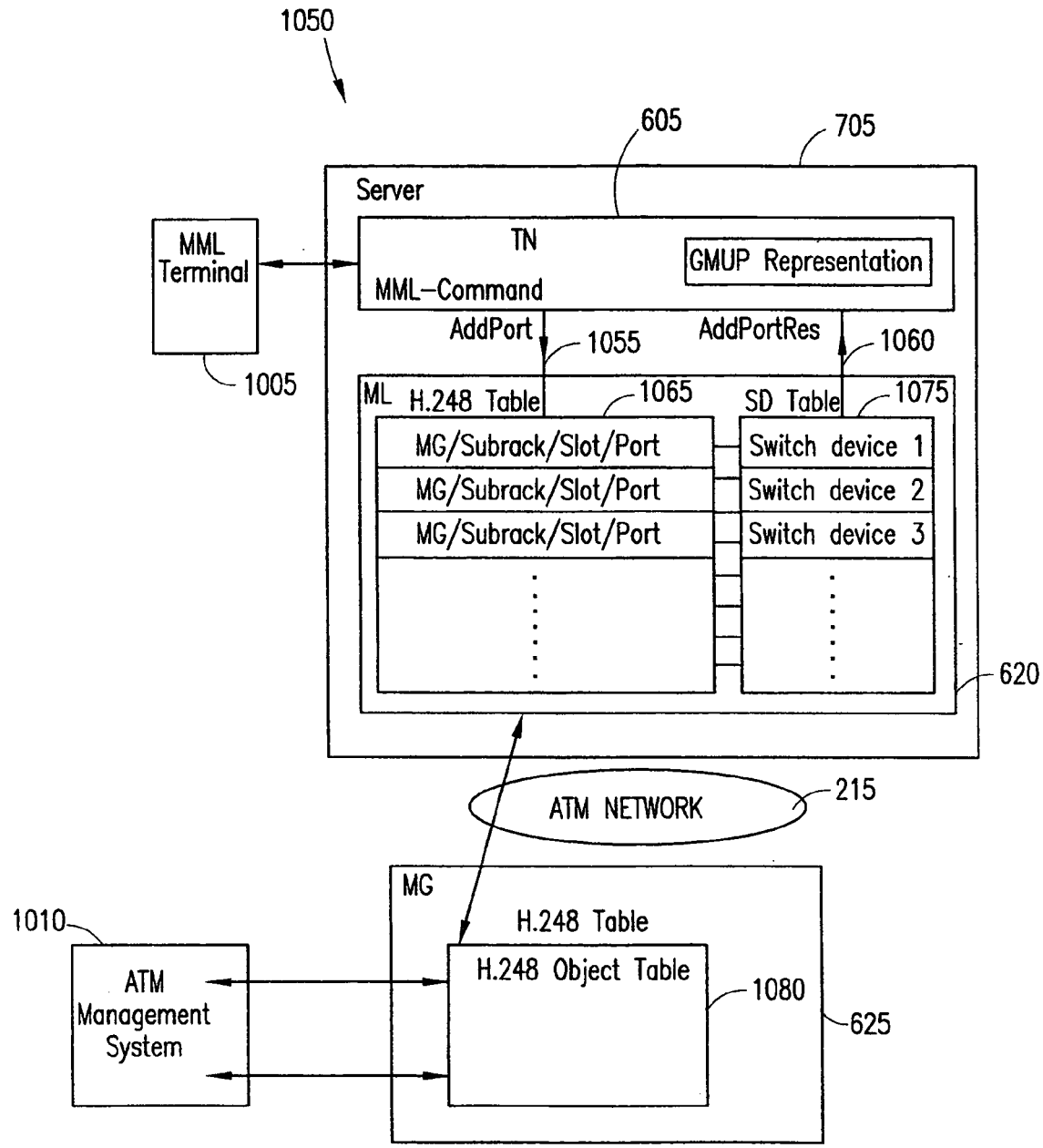

Referring now to FIGS. 10A and 10B, exemplary mapping embodiments in an exemplary tri-level nodal environment implementation in accordance with the present invention are illustrated generally at 1000 and 1050, respectively. The exemplary mapping as illustrated at 1000 includes a man machine line (MML) handler 1005 and an ATM management system 1010 that enable the general management of the illustrated tri-level nodal environment implementation. Specifically, the MML handler 1005 enables the configuring of the TN 605 portion, and the ATM management system 1010 enables the configuring of the ML 620 and MG 625 portions. Switch device management (SDM) parts 1015TN and 1015ML enable communication between the TN 605 and the ML 620, along with the transport handler (TRH) 1020. In exemplary embodiment(s), a switch device (SD) may correspond to a logical device that terminates a 31 channel logical E1 line. A context handler 1025 enables communication from/to the ML 620 to/from the ATM network.

In exemplary embodiment(s), an H.248 protocol may be employed for communication over the ATM network. A mapping part portion 1030 stores the topology of one or more MGs 625 as well as a protocol mapping of the SDM part(s) (e.g., of the circuit-switched address space) to the H.248 (e.g., of the packet-switched address space). The exemplary mapping as illustrated at 1050 includes indications of an add port instruction 1055 and an add port response instruction 1060 exchanged between the TN 605 and the ML 620. These instructions, which may originate at the MML terminal 1005, configure the mapping providing by the H.248 table 1065 and the SD table 1075. The H.248 table 1065 and the SD table 1075 together provide a mapping between H.248 addresses (e.g., an "MG/Subrack/Slot/Port" address) and SD addresses (e.g., and "SD1" address).

It should be noted that the H.248 addresses may have an unrestricted and/or unstructured format that differs from and may be more flexible than the "MG/Subrack/Slot/Port" as illustrated in FIG. 10B. In fact, an operator may be empowered to select such names. The MG 625 includes an H.248 object table 1080, which may be configured at least in part by the ATM management system 1010, for establishing communication paths through the MG 625. The tri-level approach described hereinabove in various embodiments enables pre-existing narrowband technology to be used with broadband technology. Moreover, the tri-level approach multiplies the ability to reuse a pre-existing narrowband switch by enabling a single narrowband switch to provide switching intelligence to multiple broadband switches.

Figure 11:
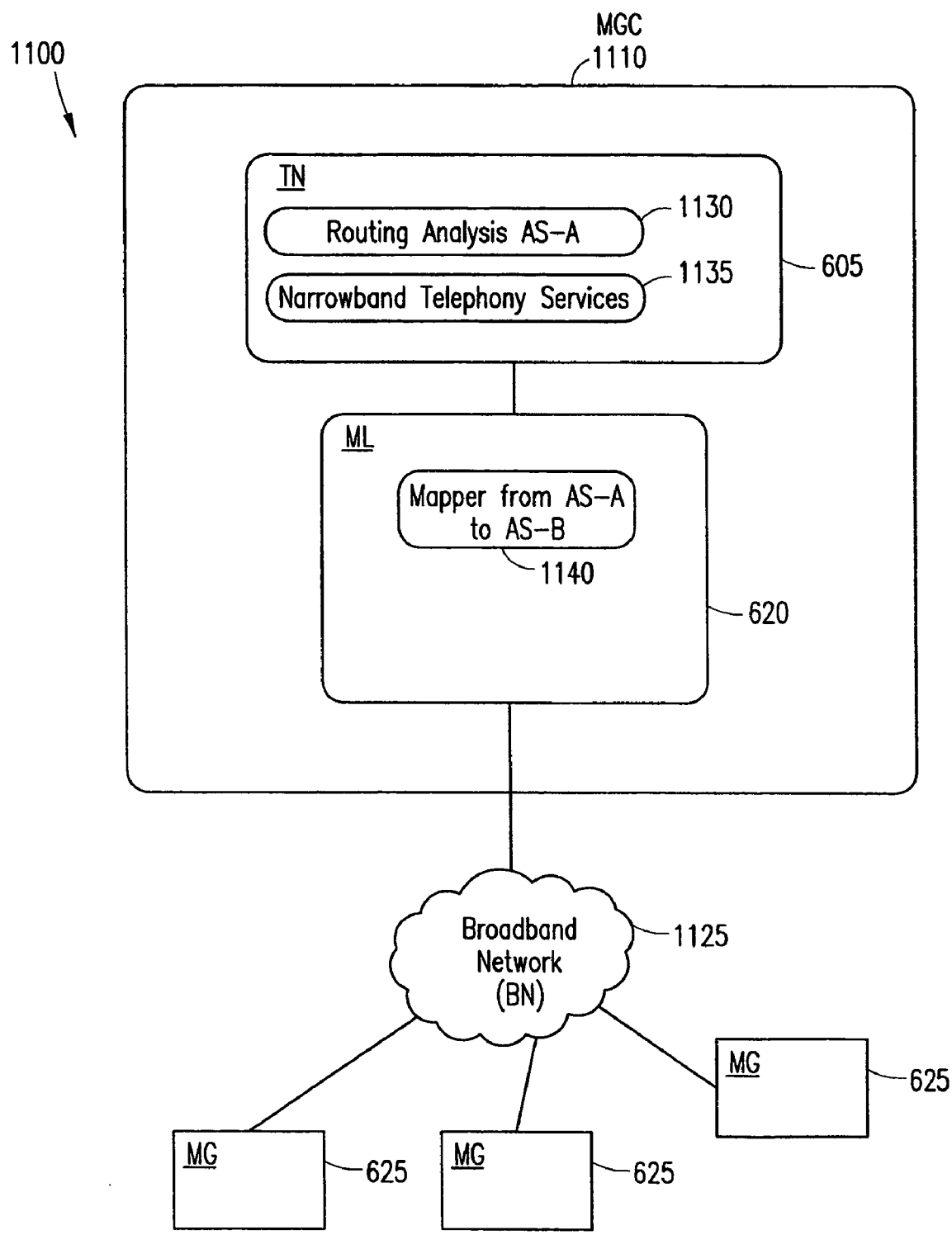
FIG. 11 illustrates an exemplary nodal environment with one or more Media Gateways (MGs) having broadband connection control functionality being controlled by a Media Gateway Controller (MGC) having narrowband call control functionality in accordance with the present invention.

Referring now to FIG. 11, an exemplary tri-level nodal environment with exemplary functionality in accordance with the present invention is illustrated generally at 1100. The exemplary tri-level nodal environment 1100 includes a TN (a.k.a. legacy switch (LS)) 605 and mediation logic (ML) 620. The ML 620 and the TN 705 are jointly referred to as a media gateway controller (MGC) 1110.

The MGC 1110 is connected to a broadband network (BN) 1125, such as the ATM network 215 of FIG. 3 et seq. It should be understood that the term BN 1125 refers to any packet-switched network, such as gigabit ethernet or packet over sonet, and is not limited to the ATM network 215 of FIG. 3 et seq. The BN 1125 provides a medium for the MGC 1110 to be in communication with the other illustrated MGs 625. It should be understood that the architecture illustrated in the exemplary tri-level nodal environment 1100 may be modified, rearranged, etc., especially in accordance with the other illustrated and described embodiments and teachings from FIGS. 5-5C, as well as those of FIGS. 6-10B.

Exemplary functionality is also illustrated in the exemplary tri-level nodal environment 1100. For example, the TN 605 may include routing analysis in address space-A functionality 1130 (e.g., which may correspond to, for example, B-number analysis, etc. as described hereinabove with reference to the embodiment(s) of FIGS. 3-3I et seq.). The TN 605 may also include narrowband telephony services functionality 1135 (e.g., which may correspond to, for example, those services provided internally by the TN 605 as well as those services provided externally via the TN 605 as described hereinabove with reference to the embodiment(s)

of FIGS. 3-3I et seq.). Another exemplary functionality illustrated in the exemplary tri-level nodal environment 1100 is mapping from address space-A to address space-B functionality 1140 of the ML 620. The mapping from address space-A to address space-B functionality 1140 (e.g., which may correspond to, for example, the mapper 585 of the embodiment(s) of FIGS. 5-5C et seq., the mapping part portion 1030 of the embodiment(s) of FIG. 10A, the tables 1065 and 1075 of the embodiment(s) of FIG. 10B, etc.) enables a conversion from, for example, a narrowband network (e.g., for which the TN 605 may have originally been designed) to a broadband network (e.g., such as the BN 1125 in which the MGs 625 may be operating).

Figures 12, 13:
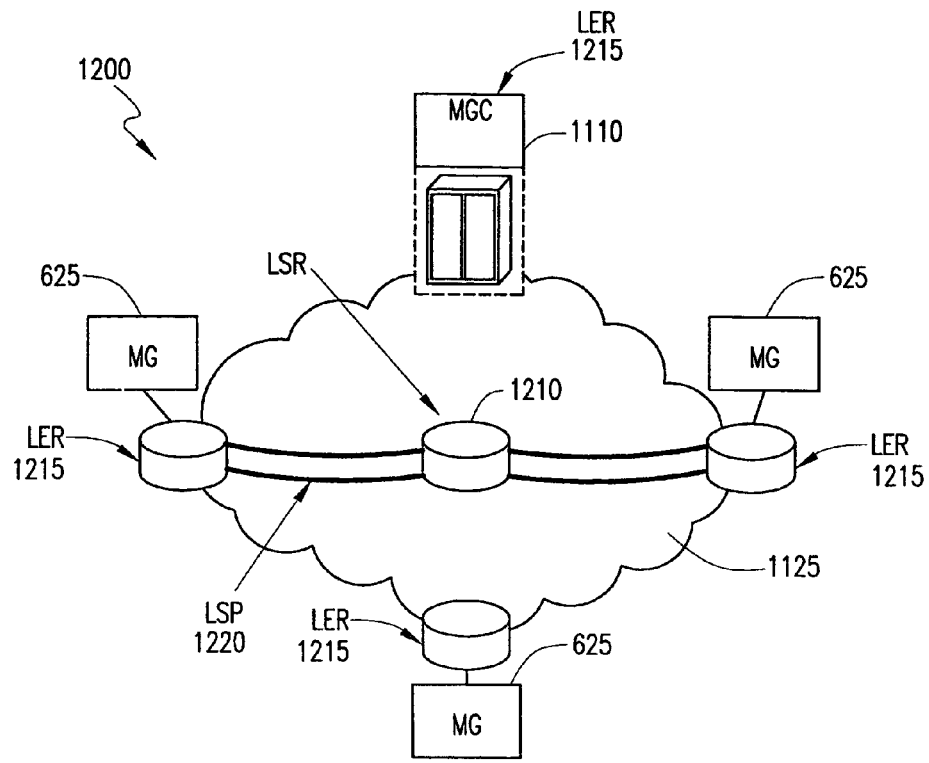
FIG. 12 illustrates an exemplary architecture for allocating bandwidth in the broadband network in accordance with the present invention.
FIG. 13 illustrates an exemplary bandwidth data structure including bandwidth allocation data in accordance with embodiments of the present invention.

A more detailed view of the interconnection between MGs 625 controlled by a MGC 1110 is shown in the exemplary architecture illustrated generally at 1200 in FIG. 12. The broadband network (BN) 1125 of FIG. 12 is based on Multi Protocol Label Switching (MPLS), in which unidirectional Label Switched Paths (LSPs) 1220 interconnect two edge Label Switch Routers (LSRs) (termed Label Edge Routers (LERs) 1215) through one or more LSRs 1210. FIG. 12 shows only two unidirectional LSPs 1220 between two LERs 1215, however, it should be understood that there can be many more LSPs 1220 between all LERs 1215. The LSPs 1220 are traffic trunks that carry media packet (e.g., voice, signaling, video or data) transmissions from one LER 1215 to another LER 1215 in the BN 1125. The LSPs 1220 are setup by an LER 1215 using explicit routing. Thus, the LER 1215 setting up the LSP 1220 has control of the complete path (including all LSRs 1220) taken by the LSPs 1220 towards the destination LER 1215. The path taken by a LSP 1220 can be calculated manually, using an on-line calculation based on Constraint Based Routing or using an off-line Traffic Engineering (TE) tool.

The LERs 1215 may either be included in the MGC 1110 and the MGs 625 or may be separate nodes connected to the MGC 1110 and MGs 625. In a conventional architecture, bandwidth can be reserved between MGs 625 in the BN 1125 without the knowledge of the MGC 1110 or other MGs 625. Therefore, the MGC 1110 may not know how much bandwidth is reserved for a particular traffic trunk (LSP 1220) between two MGs 625. In addition, a particular MG 625 may not know how much bandwidth is reserved against a specific destination, such as another MG 625, because traffic trunk setup could be ordered by an external management application (not shown).

As a result, there is a possibility that both the MGC 1110 and a particular MG 625 may believe that there is bandwidth available towards another MG 625, when in fact, there is not. If another call bearer is established towards that MG 625, some of the calls towards that MG 625 may be disturbed or dropped, as too much traffic will be on the traffic trunk. For example, the Call Admission Control mechanism in the LER 1215 could either drop a portion of the total traffic for all calls on the traffic trunk, thereby reducing the quality of all calls in the BN 1125, or, instead of dropping packets, mark some of the packets as drop priority packets to be dropped in the BN 1125 if congestion occurs.

To overcome these difficulties and avoid overuse of LSPs 1220, the architecture 1200 can be modified to provide the MGC 1110 and/or MGs 625 with information regarding the properties of traffic trunks (LSPs 1220) between different MGs 625 in the BN 1125. Referring now to FIG. 13, a new bandwidth data structure 1300 can be implemented to provide LSP information to the MGC and/or MGs. The bandwidth data structure 1300 contains information pertaining to all MGs controlled by the MGC and all traffic trunks (LSPs) interconnecting the MGs. For example, the bandwidth data structure 1300 may contain the following fields 1305: Outgoing MG 1310, Incoming MG 1320, Bandwidth Available 1330, Total Bandwidth 1340 and Statistics 1350. The Outgoing MG field 1310 stores an identity 1315 of the MG that sends media packets, the Incoming MG field 1320 stores an identity 1325 of the MG that receives the sent media packets, the Bandwidth Available field 1330 stores an amount of bandwidth 1335 currently available on the LSPs from the outgoing MG to the incoming MG, the Total Bandwidth field 1340 stores a total amount of bandwidth 1345 on the LSPs and the Statistics field 1350 stores various statistical information related to the LSPs.

Thus, each record 1360 in the bandwidth data structure 1300 includes information on all unidirectional LSPs from one MG to another MG. It should be understood that other fields 1305 may be included in the bandwidth data structure 1300 in addition to or in place of the fields 1305 shown in FIG. 13. For example, fields 1305 including information on the percentage of available bandwidth, the amount of bandwidth on each LSP, the actual amount of allocated bandwidth could be provided in the bandwidth data structure 1300.

The records 1360 in the bandwidth data structure 1300 can be initialized when the network is initially set up and updated when network changes occur. For example, the identities 1315 and 1325 of the outgoing and incoming MGs and the total amount of bandwidth 1345 between the outgoing and incoming MGs are known at the time the network is established, and can be stored in the outgoing MG, incoming MG and total bandwidth fields 1310, 1320 and 1340, respectively, in the bandwidth data structure 1300. If the network operator changes the total bandwidth 1345 available between two MGs, that change can be reflected in the bandwidth data structure 1300.

As discussed above, the bandwidth available field 1330 in the bandwidth data structure 1300 includes the current amount of available bandwidth 1335 for the LSPs going from one MG to another MG. Therefore, the bandwidth available 1335 associated with a particular record 1360 can be updated as calls are set up and released through the BN. For example, to update the bandwidth available field 1330, the maximum amount of bandwidth that each call needs (depending on the codec used, such as a dynamic multirate codec) can be provided automatically by the MG to the MGC or the MGC can query the MG for the maximum bandwidth for a particular call.

Various statistical information 1355 can also be updated as calls are set up and released through the BN and included in the bandwidth data structure 1300. One example of a statistic 1355 is a traffic measurement that could be used to reengineer the traffic trunks in the BN. Other examples of statistics 1355 include the number of calls over a period of time, Erlang (for the bandwidth usage), the number of unsuccessful calls (calls where no bearer could be set up) due to lack of internal voice resources and congestion for a measurement period.

In one embodiment, the bandwidth data structure 1300 can be stored in the MGC for centralized management of all traffic trunks in the network. In another embodiment, the bandwidth data structure 1300 can be distributed in the MGs, in which each particular MG stores only those records associated with traffic trunks interconnecting that particular MG with other MGs. However, if the bandwidth data structure is distributed in the MGs, depending on the bearer setup method (e.g., forward or backward), the MGs may not have knowledge of each other until after internal resources have already been reserved. In this case, if there is insufficient bandwidth based on an analysis of the bandwidth data structure, the MGs may be required to inform the MGC that bearer setup was unsuccessful and reestablish a new bearer setup, which could delay the bearer setup process and cause a heavy signaling load on the BN due to the additional control signaling required for reestablishment of a new bearer setup. Therefore, as discussed hereinbelow, the bandwidth data structure 1300 is assumed to be stored in the MGC. However, it should be understood that the bandwidth data structure 1300 could be distributed in the MGs with minimal modifications to the embodiments described below.

Figure 14:
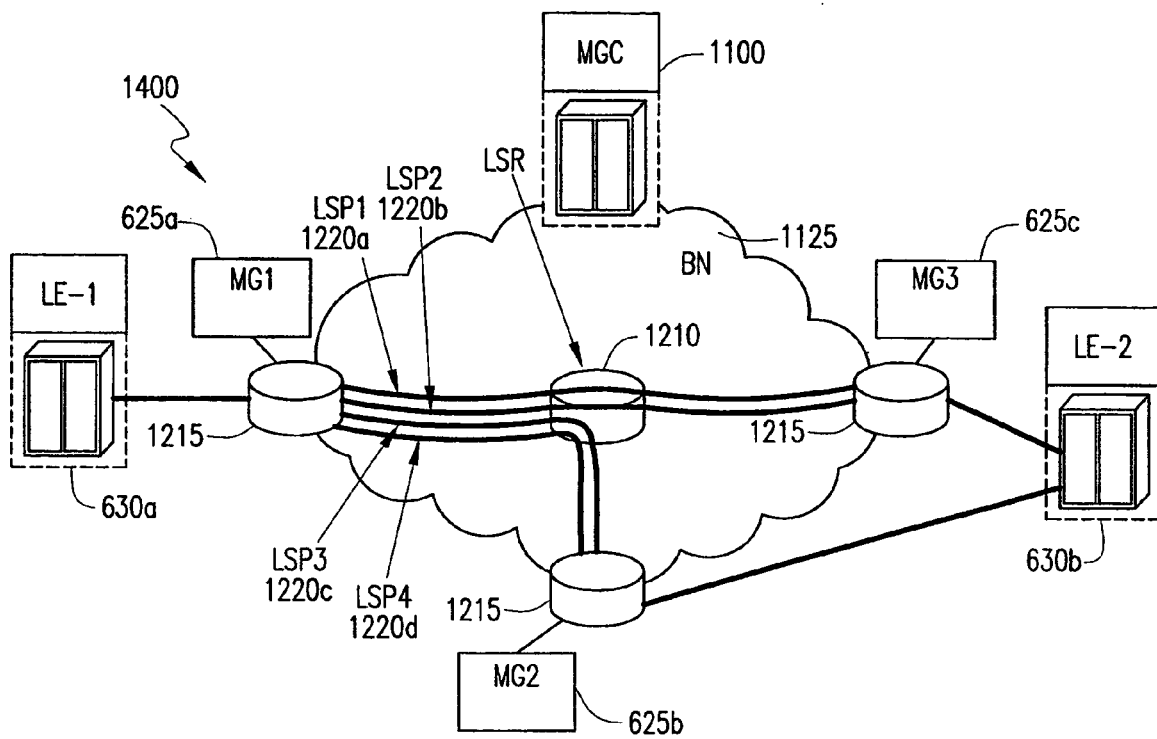
FIG. 14 illustrates exemplary alternative bandwidth allocation embodiments in accordance with the present invention.

By providing the MGC with a bandwidth data structure 1300, the MGC is capable of more efficiently allocating bandwidth for new incoming calls. For example, as can be seen in FIG. 14, the MGC 1110 has a primary route from Local Exchange 1 (LE-1) 630a to LE-2 630b via MG1 625a and MG3 625c and a secondary route via MG1 625a and MG2 625b. If the bandwidth data structure records for MG1 625a and MG3 625c indicate that the total bandwidth allocated on either path (LSP1 1220a or LSP2 1220b) is close to or equal to the total bandwidth available, the MGC 1110 can analyze the bandwidth data structure records for MG1 625a and MG2 625b to determine whether there is sufficient transmission capacity left on the trunks (LSP3 1220c and LSP4 1220d) between MG1 625a and MG2 625b. If so, the MGC 1110 can route any new incoming calls from LE-1 630a to LE-2 630b via the secondary route of MG1 625a and MG2 625b.

Figure 15:
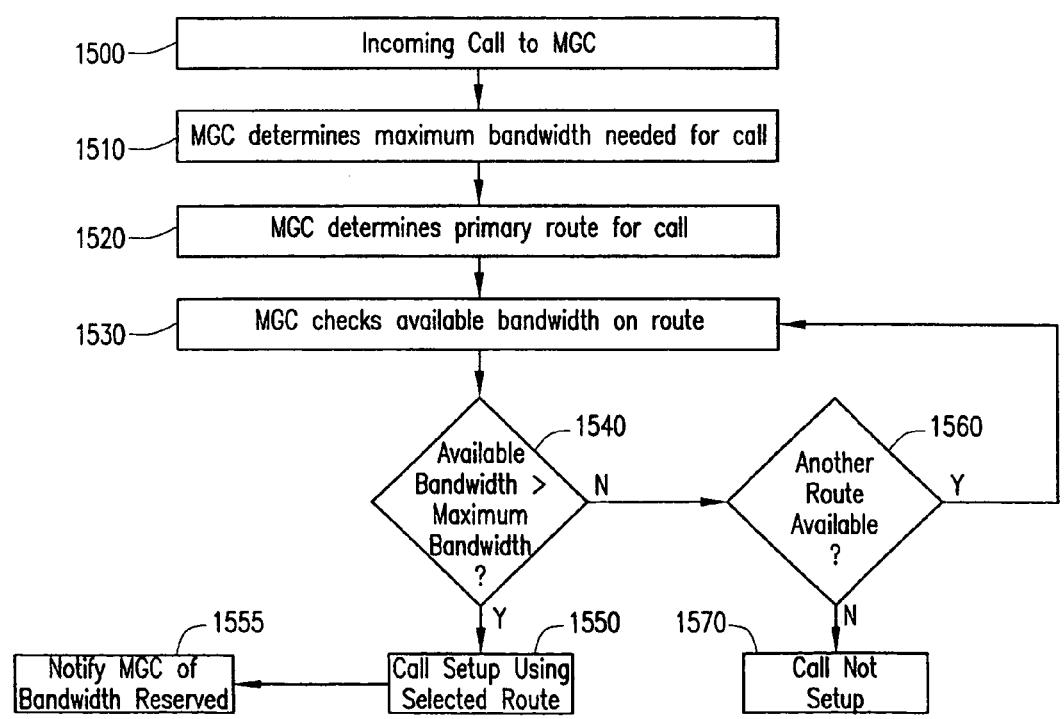
FIG. 15 illustrates exemplary steps for allocating bandwidth in a broadband network using bandwidth allocation data in accordance with embodiments of the present invention.

Referring now to FIG. 15, there is illustrated exemplary steps for routing an incoming call in a BN using the bandwidth data structure of FIG. 13. When a new call enters the BN at a particular MG (step 1500), the MGC determines the maximum bandwidth needed for the call (e.g., by querying the MG, receiving the maximum bandwidth directly from the MG or, to ease operations and maintenance and switch complexity, retrieving a default value for the maximum bandwidth) and the destination for the call (step 1510). From this information, the MGC determines the primary route for the call (step 1520) and checks the available bandwidth on the primary route (step 1530). If the available bandwidth on the primary route is greater than the maximum bandwidth required for the call (step 1540), the MGC instructs the MG to setup the call and bearer using the primary route (step 1550) and, after call setup, the MG can notify the MGC of the actual amount of bandwidth reserved for the call (step 1555).

However, if the available bandwidth on the primary route is not sufficient to handle the call (step 1540), the MGC determines whether a secondary route to the destination is available (step 1560). If so, the MGC checks the available bandwidth on the secondary route (step 1530) to determine whether there is sufficient bandwidth available on the secondary route for the call (step 1540). If so, the MGC instructs the MG to setup the call and bearer using the secondary route (step 1550) and, after call setup, the MG notifies the MGC of the actual amount of bandwidth reserved for the call (step 1555). If a secondary route is not available (step 1560), the MGC instructs the MG to not setup the call (step 1570). This process can be repeated for each potential route to the destination until either a route with sufficient bandwidth is found or all routes are exhausted.

Figure 16:
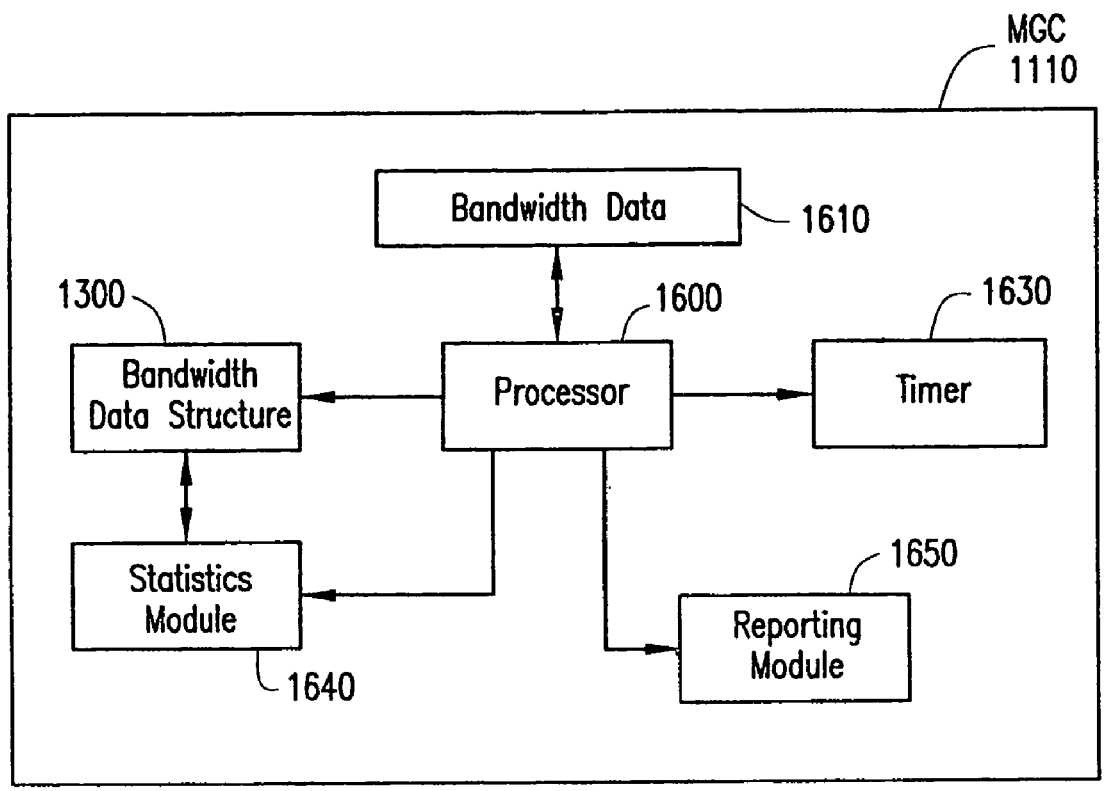
FIG. 16 illustrates exemplary functionality for maintaining and reporting statistical data representative of bandwidth allocation data in accordance with embodiments of the present invention.

Exemplary functionality for implementing the bandwidth data structure within the MGC 1110 is shown in FIG. 16. Bandwidth data 1610 is received by the MGC 1110 from MGs within the BN. The bandwidth data 1610 includes information on bandwidth allocation in the BN and can further include other network-related information such as the origination and destination nodes, the identity of the incoming MG, etc. For example, the bandwidth data 1610 can indicate the amount of bandwidth allocated by a particular MG towards another MG for a call. As another example, the bandwidth data 1610 can indicate the release of bandwidth due to the termination of a call. A processor 1600 (e.g., which may correspond to processors 332 and 342 of FIG. 3 et seq.) executes application software (not shown) capable of receiving the bandwidth data 1610 and updating a record within the bandwidth data structure 1300 with the received bandwidth data 1610.

The processor 1600 further accesses a statistics module 1640 to calculate statistics related to the bandwidth data 1610. As discussed above, such statistics could include traffic measurements for a period of time, the number of calls over a period of time, Erlang (for the bandwidth usage), the number of unsuccessful calls (calls where no bearer could be set up) and congestion for a measurement period. A timer 1630 can be initiated to begin accumulation of bandwidth data and other call-related data (e.g., successful and unsuccessful call indicators) for use by the statistical module in calculating the statistics. Once the statistics are calculated, the statistics can be stored in the bandwidth data structure 1300.

When congestion is experienced in the BN, the processor 1600 can further access a reporting module 1650 to report the congestion via an alarm or traffic measurement. The reporting module 1650 can monitor the bandwidth data structure 1300, and based on the amount of available bandwidth and various statistics, the reporting module 1650 can determine whether there is congestion in the BN. For example, if the bandwidth data structure 1300 indicates that a particular route (e.g., MG1 to MG3) is fully utilized over a period of time, the reporting module 1650 can prepare a report to that effect.

The reporting module 1650 can prepare reports based on the occurrence of predefined events (e.g., congestion, etc.) as determined by the network operator, or the reporting module 1650 can prepare periodic reports on current network conditions using the information contained in the bandwidth data structure. If the latter, the timer 1630 may also be used to indicate when the reports should be generated by the reporting module. These reports can serve to notify a network operator that changes (e.g., reengineering) are needed in the BN.

Figure 17:
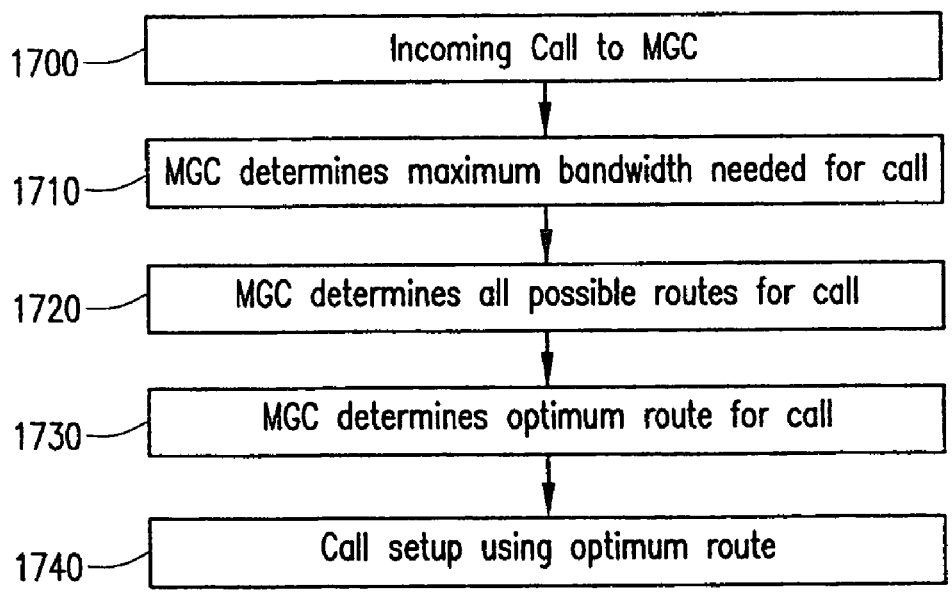
FIG. 17 illustrates exemplary steps for performing load balancing in the broadband network using bandwidth allocation data in accordance with embodiments of the present invention.

The bandwidth data structure 1300 can further enable the MGC 1110 to perform load balancing in the BN to ensure that all routes are utilized efficiently. Referring now to FIG. 17, there are illustrated exemplary steps for performing load balancing in the BN using the bandwidth data structure. Upon receiving an incoming call to the BN at the MGC (step 1700), the MGC determines the maximum bandwidth needed for the call (step 1710), as described above in connection with FIGS. 14 and 15. Thereafter, the MGC determines all possible routes (e.g., incoming MG and outgoing MG pairs) for the call (step 1720) and selects the optimum route for the call based on the maximum bandwidth needed for the call and the bandwidth available on each of the possible routes (step 1730). For example, if there are four possible routes, each having available bandwidth as follows:

MG1-MG2: 0 Mbytes available
MG2-MG1: 50 Mbytes available
MG1-MG3: 200 Mbytes available
MG3-MG1: 250 Mbytes available MG4-MG2: 400 Mbytes available
MG2-MG4: 300 Mbytes available
MG4-MG3: 800 Mbytes available
MG3-MG4: 800 Mbytes available the route with the maximum bandwidth available (i.e., MG4/MG3) would be selected if the maximum bandwidth needed for the call is less than 800 Mbytes per path. Once the optimum route is chosen, the MGC instructs the associated incoming MG to setup the call using the optimum route (step 1740).

In further embodiments, the bandwidth data structure can be expanded to include not only bandwidth information, but also quality information pertaining to the packet transmissions in the broadband network. The quality information can further assist the MGC in ascertaining the optimum route for a call. In addition, the quality information can be used to identify faults in the broadband network.

Figure 18:
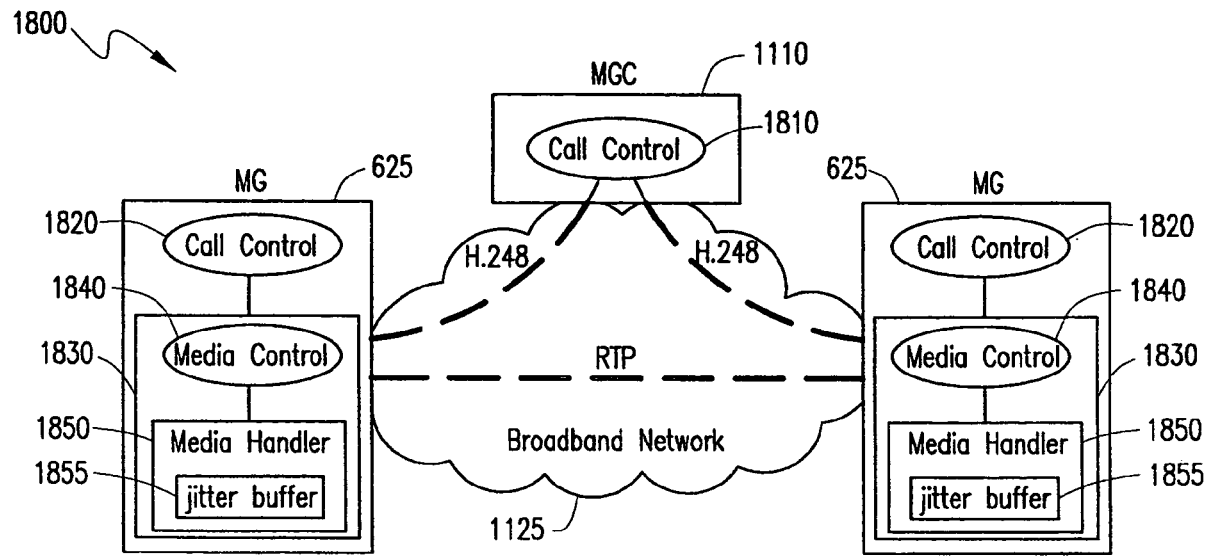
FIG. 18 illustrates an exemplary architecture for monitoring the quality of packet transmissions in the broadband network in accordance with embodiments of the present invention.

An exemplary architecture 1800 for monitoring the quality of transmissions in the broadband network 1125 is shown in FIG. 18. As discussed above, the MGC 1110 controls one or more MGs 625 using, for example, a Media Gateway Control Protocol (MGCP), such as H.248. Media (e.g. voice, video or data) can be coded and packetized in a MG 625 and sent to another MG 625 using, for example, RTP. Packetized transmissions are sent between MGs 625 only after a media session has been set up between those MGs 625 for a call. During the set up process, the MGs 625 negotiate the properties used for voice transmission (e.g., packet size, voice codec used, transmission addresses, etc.)

The negotiation functionality in the MG 625 is resident within a Call Control part 1820, while the coding and packetizing functionality in the MG 625 is resident within a Media part 1830. The Media part 1830 can be further divided into a Media Control part 1840 for controlling the transmission of media packets and a Media Handler part 1850 for coding and packetizing media streams for transmission in the BN 1125. The Call Control part 1820 in the MG 625 communicates with a Call Control part 1810 in the MGC 1110 to establish and administer a media session with another MG 625. The Call Control part 1810 in the MG 625 further communicates with the Media Control part 1840 of the same MG 625 to initiate packet transmissions upon, media session establishment and to discontinue packet transmissions upon media session termination.

In the Media Handler part 1850, jitter buffers 1855 are used to compensate for variations in transmission time in the BN 1125 by buffering received media packets for a jitter time period to enable the MG 625 to create a continuous byte stream for subsequent transmission out of the MG 625. However, if packets are dropped or delayed past the jitter time period, the quality of the call may be distorted. Therefore, in accordance with embodiments of the present invention, the jitter buffer 1855 can further perform quality measurements (hereinafter referred to as jitter buffer measurements) related to the packet transmissions to provide quality information on a per call basis or on a network basis.

Figure 19:
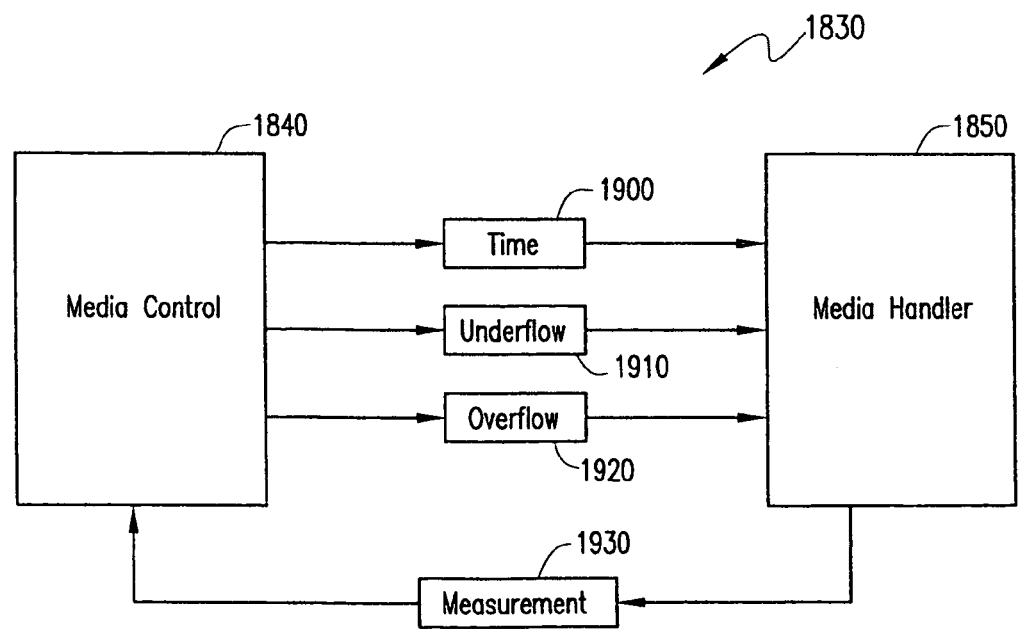
FIG. 19 illustrates exemplary functionality for measuring the quality of packet transmissions in the broadband network in accordance with embodiments of the present invention.

Exemplary functionality for measuring the quality of transmissions in the broadband network is shown in FIG. 19. Although the jitter buffer measurements are made in the Media Handler part 1850 of the Media part 1830, the measurements are controlled by the Media Control part 1840 of the Media part 1830. For every media channel set up, the Media Control part 1840 specifies whether the jitter buffer measurements are to be made or not. If the jitter buffer measurements are to be made, the Media Control part 1840 further provides one or more measurement parameters to a jitter buffer measurement function within the Media Handler 1850. For example, the measurement parameters can include one or more of the following: a starting time 1900, allowed jitter buffer underflow 1910 and allowed jitter buffer overflow 1920. It should be understood that the parameters can also be dependent upon the particular voice codec used for the call.

The starting time 1900 may be an actual start time or an initial period of time (e.g., in milliseconds) where jitter buffer measurements should not be performed. This delay period may be needed when the two MGs are not synchronized at the establishment phase. In other embodiments, the starting time 1900 may be an instruction to begin measurements upon receipt of the first packet for a call. The jitter buffer underflow provides an indication of the number of missing packets (e.g., packets that are lost or delayed beyond the jitter buffer time period). The allowed jitter buffer underflow 1910 provides an indication of the number of missing packets expected in the BN. For example, the allowed jitter buffer underflow 1910 can be a specific number of missing packets allowed within a measurement period, or alternatively, a percentage of missing packets allowed within a measurement period, e.g., 2% allowed every 5 seconds. Anything beyond the allowed jitter buffer underflow 1910 could result in call distortion. Therefore, the allowed jitter buffer underflow 1910 provides a benchmark over which jitter buffer measurements 1930 should be reported.

The jitter buffer overflow provides an indication of the number of packets that are received at a faster pace than the MG is capable of reading the packets from the jitter buffer. Jitter buffer overflow typically occurs when two MGs are not synchronized properly. The allowed jitter buffer overflow 1920 provides an indication of the maximum number of packets allowed to be buffered in the Jitter Buffer. For example, the jitter buffer overflow 1920 can be a specific number of packets allowed to be buffered within the Jitter Buffer within a measurement period, or alternatively, a percentage of the total number packets buffered within a measurement period, e.g., 2% allowed every 5 seconds. Anything beyond the allowed jitter buffer overflow 1920 could result in call distortion due to the lack of space in the Jitter Buffer for buffering new packets. Therefore, the allowed jitter buffer overflow 1920 provides a benchmark over which jitter buffer measurements 1930 should be reported.

Any measurements 1930 made by the Media Handler part 1850 are passed from the Media Handler part 1850 to the Media Control Part 1840. The measurements 1930 can be passed when a media session is terminated and/or when a configurable limit is passed. In the Media Control part 1840, the measurements may be subjected to predefined filtering to aggregate measurements for reporting to the Call Control part (1820 shown in FIG. 18) in the MG. The Call Control part in the MG can further report the aggregated measurements to the Call Control part (1810 shown in FIG. 18) in the MGC for call handling purposes. For example, the Call Control part in the MGC may release the call or reduce charging for the call based on the measurements. As another example, the Call Control part in the MGC knows that service activation for the call is progressing, and therefore, may conclude that despite the measurements, there is no need to release the call. As a further example, the Call Control part of the MGC may attempt to reallocate bandwidth to improve the quality of the call.

Figure 20A:
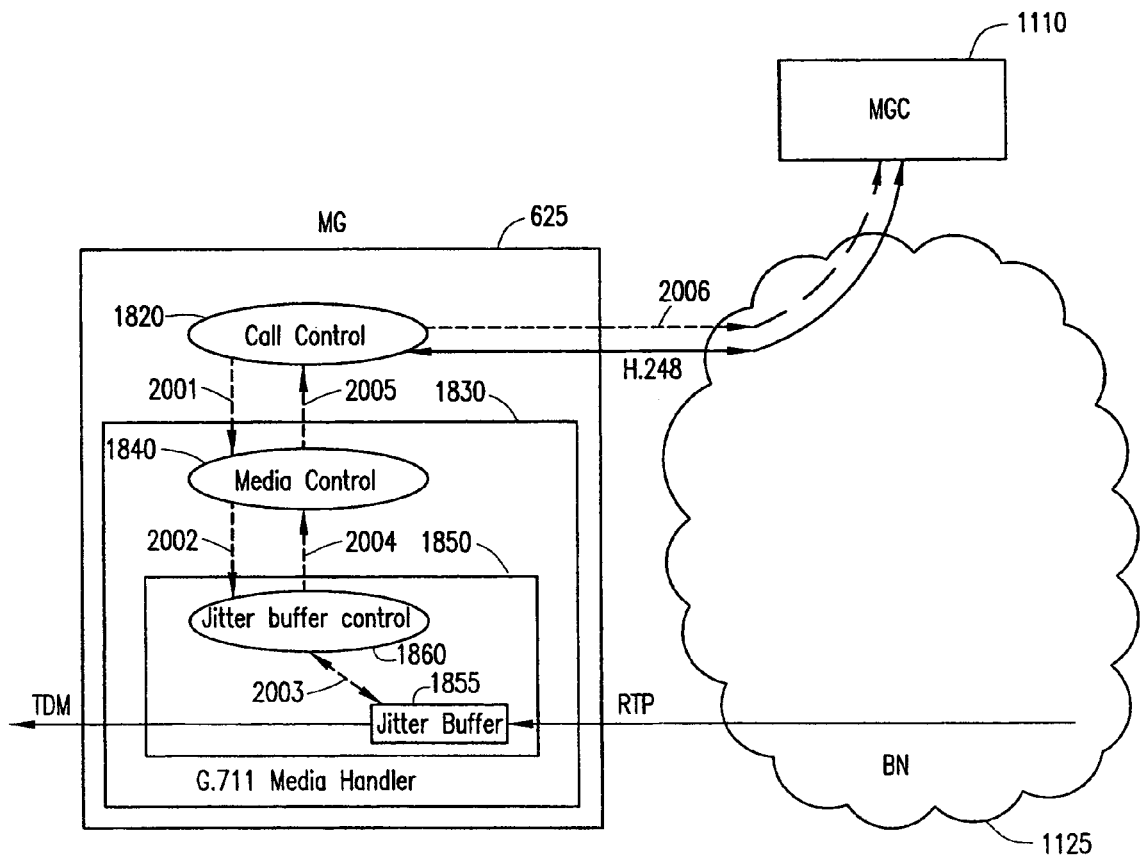
FIG. 20A illustrates exemplary steps for an MG to provide quality measurements for a call to the MGC in accordance with embodiments of the present invention.

FIG. 20A illustrates exemplary steps for an MG 625 to provide quality measurements for a call to the MGC 1100 in accordance with embodiments of the present invention. To set up a media session, at step 2001, the Call Control part 1820 in the MG 625 reserves a Media Control entity in the Media Control part 1840 of the MG 625 and passes bearer parameters and measurement parameters to the Media Control entity to establish the bearer channel. For example, such bearer parameters can include remote side address information (e.g., IP-address, UDP-port), codec (e.g., G.711 a-law) and packet size (e.g., 80 bytes). The measurement parameters can include, for example, allowed jitter buffer underflow (e.g., 2%), allowed jitter buffer overflow (e.g., 2%), packet loss measurement time (e.g., 10 seconds) and starting time (e.g., 500 ms).

Upon receipt of the bearer and measurement parameters, at step 2002, the Media Control entity activates a Jitter Buffer Control part 1860 in the Media Handler part 1850 and loads all bearer and measurement parameters into the Jitter Buffer Control part 1860. At step 2003, the Jitter Buffer Control part 1860 initiates the Jitter Buffer 1855 with the starting time to begin jitter buffer measurements. Once jitter buffer measurements have begun, the Jitter Buffer Control part 1860 is notified by the Jitter Buffer 1855 of all jitter buffer events for use in making the jitter buffer measurements. As long as no abnormalities above the predefined limits (as set by the measurement parameters) are present and the call is still active, the Jitter Buffer Control part 1860 may not provide any jitter buffer measurements to the Media Control part 1840.

However, when the defined limits for jitter buffer measurements are exceeded or the call is terminated, at step 2004, the Media Control part 1840 is notified. For example, if the number of packets lost during the predefined packet loss measurement time exceeded the allowed jitter buffer underflow, the Jitter Buffer Control part 1860 can provide the Media Control part 1840 with the number (or percentage) of packets lost. As another example, if the number of packets in the Jitter Buffer 1855 exceeds the allowed jitter buffer overflow, the Jitter Buffer Control part 1860 can provide the Media Control part 1840 with the number (or percentage) of buffered packets.

At step 2005, the Media Control part 1840 notifies the Call Control part 1820 in the MG 625 with the jitter buffer measurements for the call, and at step 2006, the Call Control part 1820 in the MG 625 notifies the Call Control part 1810 in the MGC 1110 using, for example, H.248 or another Media Gateway Control Protocol (MGCP). After the MGC 1110 receives the jitter buffer measurements, the Call Control part 1810 in the MGC 1110 can use the jitter buffer measurements for call handling purposes. For example, the Call Control part 1810 of the MGC 1110 may determine that the losses are excessive (e.g., above a threshold amount), and terminate the call and/or reduce charging for the call. As another example, if a supplementary service, such as a conference call, has been activated for the call, the Call Control part 1810 in the MGC 1110 may determine that the losses are acceptable due to the redirection of the media stream to a conference bridge.

Figure 20B:
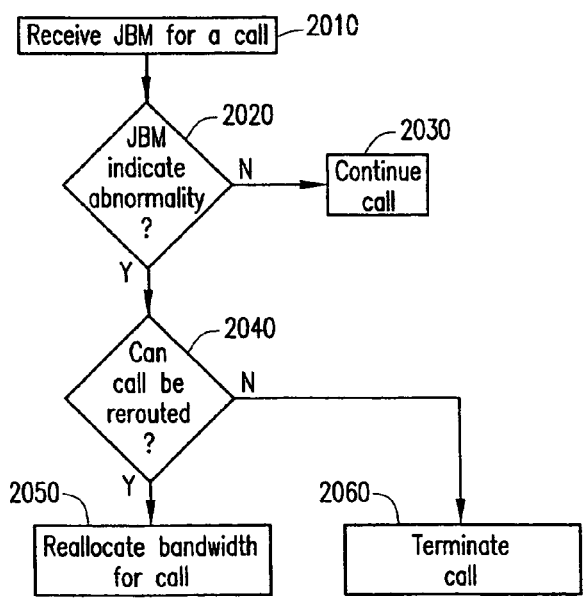
FIG. 20B illustrates exemplary steps for the MGC to reallocate bandwidth for a call using quality measurements in accordance with embodiments of the present invention.

As a further example, based on the jitter buffer measurements, the Call Control part 1810 of the MGC 1110 may attempt to reallocate bandwidth using a different route for the call to improve the quality of the call. Exemplary steps for the MGC 1110 to reallocate bandwidth for a call using quality measurements are shown in FIG. 20B. When the MGC receives the jitter buffer measurements for a call (step 2010), the MGC determines whether the jitter buffer measurements indicate that a significant abnormality exists in the call that would signify that re-routing of the call is necessary (step 2020). For example, if the jitter buffer measurements exceed a predefined threshold configurable for all MGs or specific MGs, the MGC can attempt to re-route the call. If there are no significant abnormalities, the MGC maintains the current bandwidth allocation for the call (step 2030).

However, if the call must be re-routed, the MGC determines whether there are any other possible routes for the call (step 2040). If not, the call is terminated and/or a refund can be provided (step 2060). If another route is available, in order to re-route the call (step 2050), the MGC can use the bandwidth data structure to determine all possible routes (e.g., incoming MG and outgoing MG pairs) for the call and select the optimum route for the call based on the maximum bandwidth needed for the call and the bandwidth available on each of the possible routes. Once the optimum route is chosen, the MGC instructs the associated incoming MG to reallocate bandwidth for the call by establishing a new media session with the new outgoing MG along the optimum route and transferring buffered and new media packets to the new media session.

Figure 21:
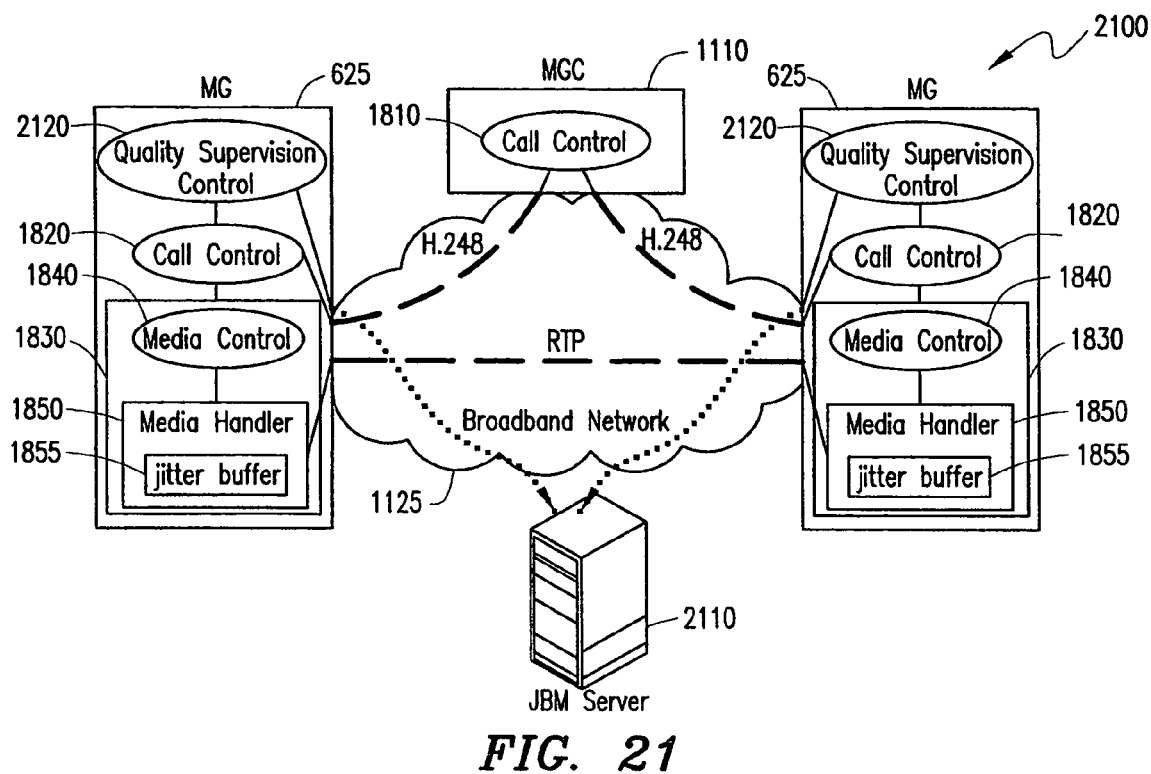
FIG. 21 illustrates an exemplary architecture implementing a server connected to receive quality measurements from all MGs within a broadband network in accordance with embodiments of the present invention.

In further embodiments, the jitter buffer measurements can be used to provide quality information for the BN as a whole and to identify faults in the BN. Referring now to FIG. 21, there is illustrated an exemplary architecture 2100 for coordinating jitter buffer measurements from all MGs 625 within the BN 1125 in order to provide quality information on a network basis in addition to or in place of quality information on a per call basis, as described above in connection with FIGS. 18-20B.

Within each MG 625, a Quality Supervision Control part 2120 provides the measurement parameters for each call to the Media Control part 1840 within the Media Handler 1850. The measurement parameters can be defined for each call or predefined for each call type or all call types. The Quality Supervision Control part 2120 for each MG 625 further receives the measurements made by the Media Handler part 1850 from the Media Control part 1840 via the Call Control part 1820 and transports the received measurements to a JBM Server 2110 for storage therein. The JBM Server 2110 can be a separate node or housed within a MG 625 or the MGC 2110.

Each MG 625 performs jitter buffer measurements for incoming packets. With all MGs 625 forwarding the jitter buffer measurements to the JBM Server 2110, all of the jitter buffer measurements for each call can be linked together to provide information on the total quality of the call. For example, each call may have several incoming sides, depending on whether the call is a two-way call or a multi-way call, and each MG 625 having one or more of the incoming sides can provide jitter buffer measurements for packets that the MG 625 receives for the call to the JBM Server 2110. In the JBM Server 2110, the jitter buffer measurements for all incoming sides of the call can be linked together (e.g., using a call identifier or other type of linking mechanism).

Figure 22:
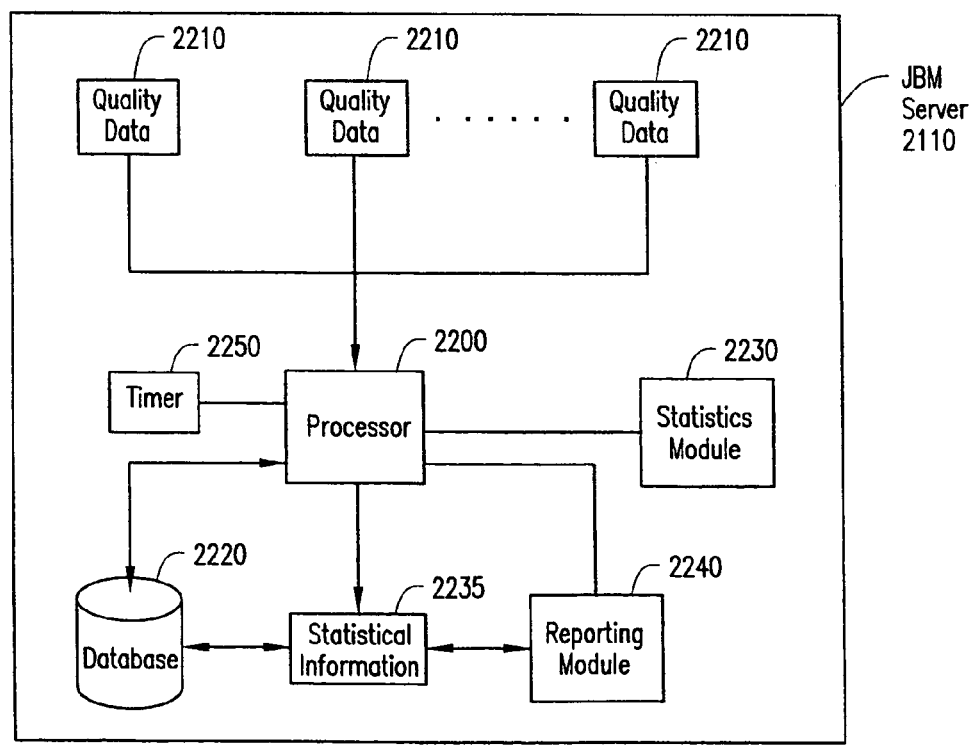
FIG. 22 illustrates exemplary functionality for performing a statistical analysis of all quality measurements received from MGs within a broadband network in accordance with embodiments of the present invention.

In other embodiments, the jitter buffer measurements received at the JBM Server 2110 can be utilized to calculate statistical information on a call level and a network level. Referring now to FIG. 22, exemplary functionality within the JBM Server 2110 is illustrated. Quality data 2210 including the jitter buffer measurements is received by the JBM Server 2110 from MGs within the BN. For example, the quality data 2210 received for each call can include the sending MG identity (e.g., IP address), the sending voice resource (e.g., UDP-port), the receiving MG identity (e.g., IP address), the receiving voice resource (e.g., UDP-port), the start date and time for the call, the duration of the call, the voice codec used for the call, the total count of packets received and the total count of all jitter buffer abnormalities, e.g., the number of missing packets and/or the number of buffered packets.

A processor 2200 (e.g., which may correspond to processors 332 and 342 of FIG. 3 et seq.) executes application software (not shown) capable of receiving the quality data 2210 and storing the quality data within a database 2220. The processor 2200 further accesses a statistics module 2230 to calculate statistical information 2235 (on a call level and/or a network level) related to the quality data 2210. Such statistical information 2235 can include, for example, the total number or percentage of packets associated with a particular call that were missing or buffered, the total number or percentage of all calls within a time period that had missing packets or buffered packets and/or the total number or percentage of calls along a certain path or route (between two MGs) that had missing packets or buffered packets. A timer 2250 could be initiated to begin accumulation of quality data 2210 for use by the statistical module 2230 in calculating the statistical information 2235. Once the statistical information 2235 is calculated, the statistical information 2235 can be stored in the database 2220.

The processor 2200 can further access a reporting module 2240 to create one or more reports on quality transmissions in the network. The reporting module 2240 can access the database 2220 to monitor quality data 2210 and statistical information 2235 to determine whether a report should be generated. The reporting module 2240 can prepare reports based on the occurrence of predefined events (e.g., congestion, etc.) for a call, for a particular route or for the network as a whole, as determined by the network operator. For example, the network operator can establish a predefined error level (e.g., when the number of calls with packet losses is above a certain limit) that is used to determine when a report should be generated.

In other embodiments, the reporting module 2240 can prepare periodic reports on current network conditions using the information contained in the database 2220. If the latter, the timer 2250 may also be used to indicate when the reports should be generated by the reporting module 2240. These reports can serve to notify a network operator that changes (e.g., reengineering) are needed in the BN. Examples of reports (daily, hourly or quarterly basis) include a listing of all calls with packet losses, a summarized report of all calls with packet losses between different MGs, a summarized report of all calls with packet losses or all calls with packet losses between different MGs for different voice codecs, the total call volume within a time period and the total number of transmitted packets for all calls within a time period. In further embodiments, the reporting module 2240 may include a graphical user interface (not shown) that receives instructions for fetching data from the database 2220 and displaying the status of the network between different MGs on a near-real-time basis (e.g., in 5 minutes).

Figures 23, 24:
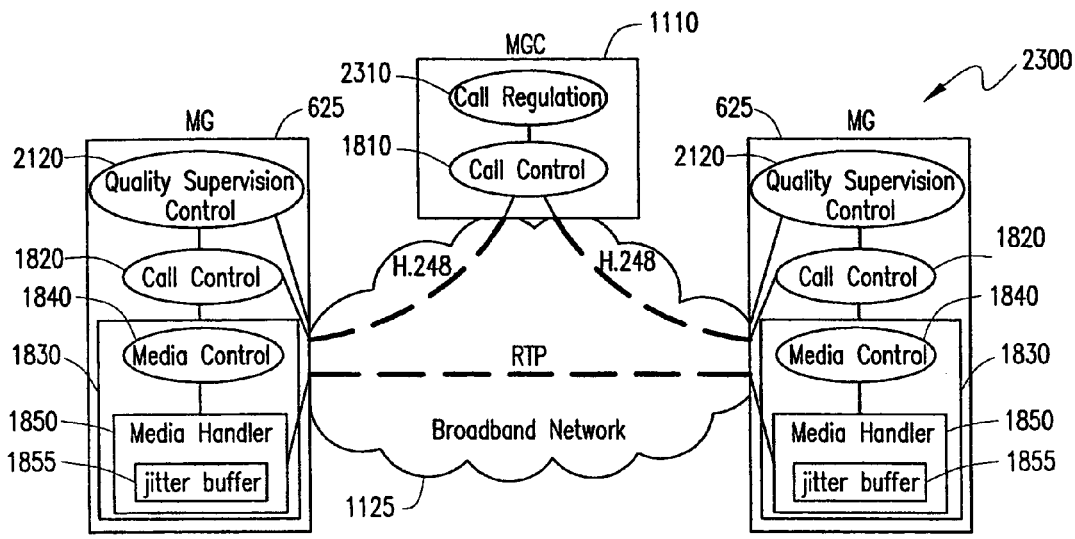
FIG. 23 illustrates an exemplary architecture for allocating bandwidth based on quality measurements in the broadband network in accordance with embodiments of the present invention.
FIG. 24 illustrates a modified exemplary bandwidth data structure incorporating statistical data representative of quality measurements in the broadband network in accordance with embodiments of the present invention.

In additional embodiments, the jitter buffer measurements can assist the MGC and/or MGs when allocating bandwidth for a call. FIG. 23 illustrates an exemplary architecture 2300 for allocating bandwidth based on jitter buffer measurements in the broadband network 1125 in accordance with embodiments of the present invention. Each of the MGs 625 in the BN returns the quality data (2210, shown in FIG. 22) including the jitter buffer measurements for different routes to the MGC 1110. The jitter buffer measurements can be transmitted for each call or aggregated for different paths.

In addition, the quality data can further include an indication of whether a call belongs to a bad quality call class or, if jitter buffer measurements are aggregated, the number of calls belonging to the bad quality class. Each MG 625 can use different configurable parameters to determine when a call should be placed in the bad quality call class or all MGs 625 can use the same parameters to identify bad quality calls. For example, a call can be labeled a bad quality call when the number of faults (e.g., the number of jitter buffer overflows and/or jitter buffer underflows) detected in the Jitter Buffer 1855 exceeds a predefined threshold.

In one embodiment, the Quality Supervision Control part 2120 in the MG 625 can determine the parameters for identifying bad quality calls and report the number of bad quality calls to the Call Control part 1810 in the MGC 1110. In other embodiments, the MGC 1110 can determine the parameters for identifying bad quality calls, and either provide the parameters to the MGs 625 or use the parameters in making the determination of whether a call is a bad quality call. In still further embodiments, the JBM Server (2110, shown in FIG. 21) could collect the jitter buffer measurements and either provide these to the MGC 1110 for determination of whether a call is a bad quality call or make the determination of whether a call is a bad quality call using parameters stored within the JBM Server.

A Call Regulation part 2310 of the MGC 1110 aggregates the quality data related to the jitter buffer measurements for all calls between two MGs 625 over a period of time. For example, the aggregated quality data can include the total count of packets received and the total count of all jitter buffer abnormalities, e.g., the number of missing packets and/or the number of buffered packets, and/or a percentage of bad quality calls or a number of bad quality calls between two MGs 625 for a period of time. As another example, the aggregated quality data can include a bad quality value assigned to each route based on the number or percentage of bad quality calls on the route. However, it should be understood that any type of aggregated quality data that provides an indication of the quality of transmissions on a route between two MGs 625 in a BN 1125 can be used.

The Call Regulation part 2310 of the MGC can further provide the aggregated quality data to the Call Control part 1810 for bandwidth allocation purposes. For example, when two or more potential routes for an incoming call to the BN 1125 exist, the Call Regulation part 2310 of the MGC 1110 can provide the aggregated quality data to the Call Control part 1810 in the MGC 1110 to select the route with the fewest number or lowest percentage of bad quality calls using the aggregated quality data stored within the MGC 1110. As another example, a quality limit can be established, such that no bandwidth is allocated on routes where the number or percentage of bad quality calls exceeds the quality limit. As a further example, if the aggregated quality data includes a quality value assigned to a particular route, the quality value can be compared with a minimum quality threshold to prevent calls from being set up along routes that do not meet the minimum quality threshold.

Referring now to FIG. 24, to facilitate the allocation of bandwidth using aggregated quality data, the bandwidth data structure 1300 in the MGC 1110 can be modified to include a Quality field 1370. The Quality field 1370 provides a mechanism to link the aggregated quality data 1375 to the records 1360 in the bandwidth data structure 1300. For example, the aggregated quality field 1370 can provide, for each record 1360, the total count of all jitter buffer abnormalities for all calls along a path (e.g., which can correspond to LSP 1220 of FIG. 12) over a period of time, a quality value and/or the percentage or number of bad quality calls over a period of time associated with the particular path applicable to that record. In addition, various statistical information 1355 in the Statistics field 1350 can be calculated using the aggregated quality data 1375. The statistical information and aggregated quality data 1375 can also be used to provide reports on the quality of transmission as in the BN. Furthermore, the aggregated quality data 1375 within the Quality field 1370 can be updated periodically for use by the Call Regulation part in the MGC in allocating bandwidth for a call.

Figure 25:
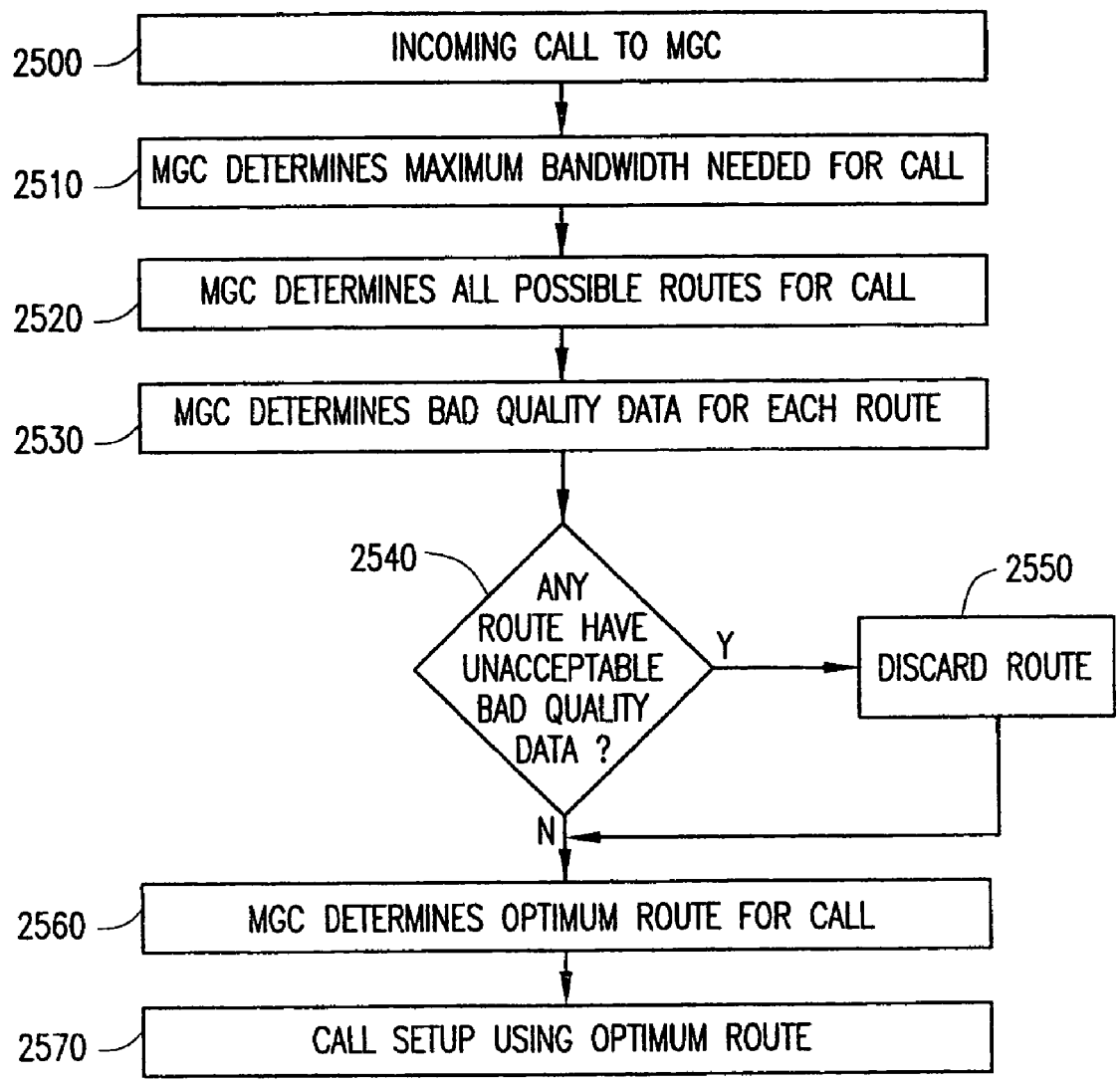
FIG. 25 illustrates exemplary steps for allocating bandwidth using quality measurements in accordance with embodiments of the present invention.

Exemplary steps for allocating bandwidth based upon the aggregated quality data are illustrated in FIG. 25. When a new call enters the BN at a particular MG (step 2500), the MGC determines the maximum bandwidth needed for the call (e.g., by querying the MG or receiving the maximum bandwidth directly from the MG) and the destination for the call (step 2510). From this information, the MGC determines all possible routes for the call (step 2520) and checks the aggregated quality data on each of the potential routes (step 2530). If the aggregated quality data for each potential route indicates that one or more routes do not meet quality standards in the BN (step 2540), the MGC discards those routes that do not meet the quality standards (step 2550).

From the remaining routes that do meet the quality standards, the MGC selects the optimum route for the call based on the aggregated quality data, bandwidth available on each of the remaining routes and other factors as may be determined by the network operator (step 2560). For example, the MGC may select the route having the lowest bad quality value or percentage of bad quality calls if that route has sufficient bandwidth for the call. Once the optimum route is selected, the MGC instructs the MG to setup the call and bearer using the optimum route (step 2570).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunication system comprising:
   a plurality of connection control nodes, each connection control node further comprising broadband switching fabric;
   a broadband network connected to said plurality of connection control nodes, said broadband network further comprising a plurality of paths, each of said plurality of paths establishing a communication link between certain two of said plurality of connection control nodes; and
   at least one call control node, further comprising:
      narrowband switching fabric;
      switching intelligence for providing call control for said narrowband switching fabric and said plurality of connection control nodes:
         a data structure containing bandwidth data identifying an amount of available bandwidth on at least one of the plurality of paths; and
         means for selecting at least one of said paths for switching an incoming call through the broadband network interconnecting said plurality of connection control nodes using said bandwidth data and over said broadband switching fabric.

2. The telecommunications system of claim 1, wherein said at least one call control node is a Media Gateway Controller and said plurality of connection control nodes are Media Gateways.

3. The telecommunications system of claim 1, wherein said data structure further comprises statistical information related to said bandwidth data on each of said paths.

4. The telecommunications system of claim 3, further comprising:
   means for performing a calculation of said statistical information related to said bandwidth data on each of said paths, said calculation being performed continuously or periodically; and
   means for storing said statistical information in said data structure.

5. The telecommunications system of claim 1, further comprising:
   means for allocating bandwidth on said at least one selected path for said incoming call; and
   means for updating said bandwidth data within said data structure for said at least one selected path based on said bandwidth allocated for said incoming call.

6. The telecommunications system of claim 1, wherein said means for selecting further comprises:
   means for receiving a maximum bandwidth amount for said incoming call;
   means for determining a list of routes from said plurality of paths for said incoming call, each of said routes including at least one of said paths; and
   means for selecting an optimum route from said list of routes based on said maximum bandwidth amount and said bandwidth data for each of said paths associated with each of said routes on said list of routes, said amount of available bandwidth on each of said paths associated with said optimum route being greater than said maximum bandwidth amount for said call.

7. The telecommunications system of claim 1, wherein said data structure further includes quality data related to the quality of packet transmissions on at least one of said plurality of paths within said broadband network.

8. The telecommunications system of claim 7, wherein each of said connection control nodes has a jitter buffer therein for buffering packets received through said broadband network, said quality data being based on measurements related to said jitter buffer.

9. The telecommunications system of claim 7, wherein said quality data includes an indication of the number of bad quality calls along each of said plurality of paths, measurements being used to determine whether a particular call is a bad quality call.

10. The telecommunications system of claim 7, wherein said means for selecting further comprises:
    means for determining a list of routes from said plurality of paths for said incoming call, each of said routes including at least one of said paths; and
    means for selecting an optimum route from said list of routes based on said quality data and said bandwidth data for each of said paths associated with each of said routes on said list of routes.

11. A telecommunications system for monitoring bandwidth allocation in a broadband network, comprising
    a plurality of connection control nodes each having broadband switching fabric;
    at least one call control node having switching intelligence and narrowband switching fabric, said plurality of connection control nodes being controlled by said at least one call control node; and the plurality of paths for interconnecting said plurality of connection control nodes:
wherein said at least one call control node further comprises:
means for determining quality data related to the quality of packet transmissions on at least one of said plurality of paths within said broadband network;
means for determining bandwidth data identifying an amount of available bandwidth on at least one of a plurality of paths within said broadband network; and
means for selecting at least one of said paths for switching an incoming call through two of said plurality of connection control nodes using said bandwidth data and said quality data.

12. The telecommunications system of claim 11, wherein each of said connection control nodes has a jitter buffer therein for buffering packets received through said broadband network, said quality data being based on measurements relate to said jitter buffer.

13. The telecommunications system of claim 11 further comprising:
means for performing a calculation of statistical information related to said bandwidth data on each of said paths, said calculation being performed continuously or periodically.

14. The telecommunications system of claim 11, further comprising:
means for allocating bandwidth on said at least one selected path for said incoming call; and
means for updating said bandwidth data for said at least one selected path based on said bandwidth allocated for said incoming call.

15. A call control node within a hybrid telecommunication system including a plurality of connection control nodes, each connection control node having broadband switching fabric and a broadband network, said broadband network further including a plurality of paths, each of said plurality of paths establishing a communication link between certain two of said plurality of connection control nodes, said call control node comprising:
narrowband switching fabric;
switching intelligence for providing call control for said narrowband switching fabric and each of said plurality of connection control nodes;
a data structure containing bandwidth data identifying an amount of available bandwidth on at least one of the plurality of paths; and
means for selecting at least one of said paths using said bandwidth data for switching an incoming call through the broadband network interconnecting said plurality of connection control nodes over said broadband switching fabric.

16. The call control node of claim 15, wherein the call control node is a Media Gateway Controller.

17. The call control node of claim 15, wherein said data structure further comprises statistical information related to said bandwidth data on each of said paths.

18. The call control node of claim 17, further comprising:
means for performing a calculation of said statistical information related to said bandwidth data on each of said paths, said calculation being performed continuously or periodically; and
means for storing said statistical information in said data structure.

19. The call control node of claim 15, further comprising:
means for allocating bandwidth on said at least one selected path for said incoming call; and
means for updating said bandwidth data within said data structure for said at least one selected path based on said bandwidth allocated for said incoming call.

20. The call control node of claim 15, wherein said data structure further includes quality data related to the quality of packet transmissions on at least one of said plurality of paths within said broadband network.

21. The call control node of claim 20, wherein each of said connection control nodes has a jitter buffer therein for buffering packets received through said broadband network, said quality data being based on measurements related to said jitter buffer.

22. The call control node of claim 21, wherein said means for selecting further comprises:
means for selecting an optimum route based on said quality data and said bandwidth data for each of said paths.

* * * * *

UNITED STATES PATENT AND TRADEMARK OFFICE
CERTIFICATE OF CORRECTION

PATENT NO.         : 7,283,518 B2
APPLICATION NO. : 10/719337
DATED                 : October 16, 2007
INVENTOR(S)       : Vikberg et al.

Page 1 of 1

It is certified that error appears in the above-identified patent and that said Letters Patent is hereby corrected as shown below:

On the Title Page, Item (73), under "Assignee", Line 1, delete "Telefonktiebolaget" and insert -- Telefonaktiebolaget --, therefor.

In Fig. 3F, Sheet 7 of 26, Line 2, delete "ISTN" and insert -- ISDN --, therefor.

In Column 12, Line 38, delete "$351_o$," and insert -- $351_O$ --, therefor.

In Column 16, Line 16, delete "$350_o$," and insert -- $350_O$ --, therefor.

In Column 36, Line 8, in Claim 4, delete "claim 3." and insert -- claim 3, --, therefor.

Signed and Sealed this

Eighth Day of July, 2008

JON W. DUDAS
*Director of the United States Patent and Trademark Office*